United States Patent
Lamoureux et al.

(10) Patent No.: US 9,213,988 B2
(45) Date of Patent: Dec. 15, 2015

(54) ELECTRONIC COMMERCE INFRASTRUCTURE SYSTEM

(75) Inventors: Bob Lamoureux, Wellesley Hills, MA (US); Paul Jaminet, Arlington, MA (US); Edward Shea, Canton, MA (US); Alexis Kopikis, Brighton, MA (US); John Boland Constantine, Jr., Andover, MA (US); Matthew Kuntz, Wellesley, MA (US); Todd Bremner, Winchester, MA (US)

(73) Assignee: Thomson Reuters Global Resources, Baar (CH)

( * ) Notice: Subject to any disclaimer, the term of this patent is extended or adjusted under 35 U.S.C. 154(b) by 293 days.

(21) Appl. No.: 13/220,117

(22) Filed: Aug. 29, 2011

(65) Prior Publication Data

US 2012/0110053 A1    May 3, 2012

Related U.S. Application Data

(60) Division of application No. 11/873,998, filed on Oct. 17, 2007, now Pat. No. 8,010,412, which is a continuation of application No. 09/697,024, filed on Oct. 25, 2000, now Pat. No. 7,287,089.

(51) Int. Cl.
*G06Q 30/00* (2012.01)
*G06Q 20/00* (2012.01)
*G06Q 30/06* (2012.01)

(52) U.S. Cl.
CPC ............ *G06Q 30/06* (2013.01); *G06Q 30/0601* (2013.01)

(58) Field of Classification Search
None
See application file for complete search history.

(56) References Cited

U.S. PATENT DOCUMENTS

| | | | | |
|---|---|---|---|---|
| 6,029,168 | A  * | 2/2000 | Frey | |
| 6,348,951 | B1 * | 2/2002 | Kim | 348/564 |
| 6,601,234 | B1 * | 7/2003 | Bowman-Amuah | 717/108 |
| RE38,610 | E  * | 10/2004 | Lum et al. | 348/720 |
| 6,801,936 | B1 * | 10/2004 | Diwan | 709/219 |
| 7,287,089 | B1 * | 10/2007 | Lamoureux et al. | 709/238 |

* cited by examiner

*Primary Examiner* — Ryan Zeender
*Assistant Examiner* — Christopher Buchanan

(57) ABSTRACT

A networked commercial interaction management method assembles information into bundles that include a data element reference and meta data describing the data element. The method distributes the meta data and the data element reference from the bundles through the network, and distributes copies of the data elements in the bundles from the network node of their respective data owners to the network nodes of accessors using the meta data and the data element reference distributed through the network. In at least one embodiment, the method periodically issues bundle version identifying signals to different nodes of the network. The bundle version identifying signals indicate changes to the data elements to the network nodes of accessors.

22 Claims, 19 Drawing Sheets

| RECEIVED | PACKAGE TYPE | TICKER(S) | HEADLINE | AUTHOR | FIRM | DELETE |
|---|---|---|---|---|---|---|
| 10:14 09/13/00 | LOWERED | OOP | OFFICE DEPOT - MKT OUTPERFORM TO PERFORM | C. HARPER | JP MORGAN | ☒ |
| 16:21 09/13/00 | TRADE IDEA | RTRL | BLUE HORSESHOE LOVES REUTERS BASED ON WORLDSTREET DEAL | G. GECKO | GECKO | ☒ |
| 10:11 09/13/00 | INTERNAL COMMENT | QCOM | MID-DAY TRADING COMMENT | V. LALEV | AMERICAN CENTURY | ☐ |
| 13:42 09/13/00 | ESTIMATES INCREASED | DCLK | DOUBLECLICK - REVISING ESTIMATES ON MARKET SOFTNESS | D. HINGIS | ABN-AMRO | ☐ |
| 10:46 09/13/00 | REITERATE RATING | AOL | AOL - REITERATE BUY, THIS STOCK CAN DO NO WRONG! | K. SULIVAN | JP MORGAN | ☒ |
| 09:52 09/13/00 | BUY | AOL | AOL - LOOKS LIKE A LITTLE RALLY FOR TODAY! | L. HARVEY | CSFB | ☐ |
| 10:02 09/13/00 | NOTE | ACT, AOL, ARPT, CEN, | TECHNOLOGY & TELECOM WEEKLY | J. RUSSELL | CSFB | ☐ |
| 00:06 09/13/00 | NOTE | | LIGHT WEEK ON ECONOMIC CALENDAR | R. DIAZ | JP MORGAN | ☐ |
| 11:08 09/13/00 | INTERNAL COMMENT | AAPL | APPLE IS UNDER FIRE!!! | S. LECLAIR | AMERICAN CENTURY | ☐ |
| 10:25 09/13/00 | ANALYST EVENT | CMGI | 2Q RESULTS | K. SULIVAN | JP MORGAN | ☐ |
| 10:44 09/13/00 | COMPANY UPDATE | CMGI, SFE, ICGE, XLA, | INTERNET HOLDING COMPANIES - SETCOR UPDATE | R. HICKS | ABN-AMRO | ☐ |
| 10:45 09/13/00 | RECOMMENDATION | CMGI | CMGI - DOWN BUT NOT OUT FOR THE COUNT! | C. HARPER | JP MORGAN | ☐ |
| 13:55 09/13/00 | ESTIMATES INCREASED | AOL | AOL - INCREASING OUT ESTIMATES FROM $0.09 TO $0.11 | R. DIAZ | JP MORGAN | ☐ |
| 10:01 09/13/00 | RESEARCH | AOL, AMAT, ACSCO, | US STRATEGY CALL | B. SHEA | ABN-AMRO | ☐ |

FIG. 12

| WORLDSTREET NET INBOX | | | | | | | □|◫|✕ |
|---|---|---|---|---|---|---|---|
| INBOX | | CREATE ▾ | □ DELETE | | GO | GROUP BY TICKERS ▾ | FILTERS ON |
| RECEIVED | PACKAGE TYPE | TICKER(S) | ◀) | □ | HEADLINE | AUTHOR | FIRM | DELETE |
| ⊟ (NONE) | | | | | | | | |
| 00:06 09/13/00 | NOTE | | | | LIGHT WEEK ON ECONOMIC CALENDAR | R. DIEZ | JP MORGAN | □ |
| ⊞ AAPL (1) | | | | | | | | |
| ⊞ ACTI(1) | | | | | | | | |
| ⊞ AKAM(1) | | | | | | | | |
| ⊞ AOL(6) | | | | | | | | |
| ⊞ ARPT(1) | | | | | | | | |
| ⊞ CIEN(1) | | | | | | | | |
| ⊟ CMGI(5) | | | | | 20 RESULTS | | | |
| 10:25 09/13/00 | ANALYST EVENT | | | □ | INTERNET HOLDING COMPANIES - SECTOR UPDATE | K. SULIVAN | JP MORGAN | □ |
| 10:44 09/13/00 | COMPANY UPDATE | | | | CMGI - TODAY'S CONFERENCE CALL HIGHLIGHTS | R. HICKS | ABN-AMRO | ☑ |
| 10:45 09/13/00 | ROCEMMENDATION | | | | CMGI - DOWN BUT NOT OUT FOR THE COUNT! | S. KRAFT | AMERICAN CENTURTY | □ |
| 13:55 09/13/00 | ESTIMATES INCREASED | | | | | C. HARPER | JP MORGAN | □ |
| 10:01 09/13/00 | RESEARCH | | | | CMGI REPORTS IN LINE WITH OUT - $0.74 ESTIMATES | R. CONSTANTINE | CSFB | □ |
| # OF PACKAGES | | | | | | | 3:07 PM | |

FIG. 13

WORLDSTREET NET OUTBOX

| SENT | RECIPIENT | PACKAGE TYPE | TICKER(S) | HEADLINE | STATUS | RETRACT |
|---|---|---|---|---|---|---|
| 09:49 12/30/99 | F. CUCCI | BUY | MCHP | MICROCHIP TECH; THE BREAKOUT IS JUST BEGINNING | UNDER REVIEW | ☑ |
| 09:38 12/30/99 | T. ANGERS | BUY | CSCO | CISCO STRONG REGARDLESS OF CURRENT MARKET CONDITIONS; BUY THE CLIPS | UNDER REVIEW | ☑ |
| 09:33 12/30/99 | B. SIMON, N. VOUSAKIS D. RILEY | BUY | CSCO, JDSU | JDSU LOOKING LIKE CISCO PART 1 | UNDER REVIEW | ☐ |
| 09:29 12/30/99 | G. TULT | INTERNAL COMMENT | CMGI | CMGI - TODAY'S CONFERENCE CALL HIGHLIGHTS | RELEASED | ☐ |
| 09:21 12/30/99 | K. ANDURS, A GIBSON | IN-LINE RESULTS | CMGI | CMGI REPORTS IN LINE WITH OUT - $0.74 ESTIMATES | UNDER REVIEW | ☑ |
| 09:21 12/30/99 | J. CONSTANTINE | NOTE | | LIGHT WEEK ON ECONOMIC CALENDAR | RELEASED | ☐ |
| 09:20 12/30/99 | A. OSMAN | ESTIMATES INCREASED | DCLK | DOUBLECLICK - REVISING ESTIMATES ON MARKET SOFTNESS | RELEASED | ☐ |
| 09:15 12/30/99 | T. BRAMMER | ANALYST EVENT | WMT | DEPARTMENT STORES: MAJOR ISSUES FACING THE INDUSTRY | RELEASED | ☐ |
| 09:10 12/30/99 | T. MILLER, W. BARKER E. BURKE, M. COOLEY C. MURRAY, B. WEBER | ESTIMATES INCREASED | AOL | AOL - INCREASING OUR ESTIMATES FROM $0.09 TO $0.11 | RELEASED | ☐ |
| 08:55 12/30/99 | P. MONATY | INTERNAL COMMENT | AOL | DOES ANYONE KNOW HOW HAS BEEN UNLOADING TODAY? | UNDER REVIEW | ☐ |
| 08:45 12/30/99 | A. COOPER | CONFERENCE | LU, SCMR, AKAM, AOL | TELECOM AND DATA INFRASTRUCTURE CONFERENCE | RELEASED | ☐ |
| 17:56 12/30/99 | J. WILSON, T. RAGSDALE, B. COOK | BUY | HLTH | AOL - LOOKS LIKE A LITTLE RALLY FOR TODAY! | RELEASED | ☐ |
| 16:49 12/30/99 | A. OSMAN | INTERNAL COMMENT | AOL, AMAT, ACSCO | QUINTILES ACQUISITION COMPLETED - SHOULD HIT THE TAPE SHORTLY. | RELEASED | ☐ |
| 16:17 12/30/99 | | RESEARCH | ACTL, AOL | U.S. STRATEGY CALL | RELEASED | ☐ |
| 15:48 12/30/99 | | NOTE | | TECHNOLOGY & TELECOM WEEKLY | RELEASED | ☐ |

| WORLDSTREET NET INVITATIONS | | | | | _ □ × |
|---|---|---|---|---|---|
| INVITATIONS | | CREATE ▾ | ✓ I ACCEPT  ✗ I DECLINE | | VIEW RECEIVED ▾ |
| RECEIVED | | AUTHOR | FIRM | NOTE | |
| OCT-01-00 | 09:45 AM | T. BREMNER | JEFFERIES SECURITIES | OFFERING NEW COVERAGE ON 6 HOT BIOTECH STOCKS | ☒ |
| SEP-28-00 | 10:24 AM | A. KOPKINS | PAINE WEBBER | DISCOVER A NEW EARNINGS MODEL | ☐ |
| SEP-27-00 | 01:16 PM | T. MURPHY | JANUS | WOULD YOU LIKE TO COLLABORATE? | ☒ |
| SEP-26-00 | 05:22 PM | P. HIDE | LPL FINANCIAL | INITIATING COVERAGE ON 3 NEW STOCKS | ☐ |
| SEP-26-00 | 02:19 PM | J. LENNON | GOLDMAN SACHS | LOW RATES FOR BULK TRADES - WE WANT YOUR BUSINESS | ☐ |
| SEP-24-00 | 09:28 AM | W. JOBES | BANCORP | INITIATING NEW COVERAGE IN EMERGING MARKETS. | ☐ |
| # OF INVITATIONS | | | | | 5:03 PM |

FIG. 17

| WORLDSTREET NET INVITATIONS | | | | CREATE ▾ | REVOKE | VIEW REPLIES ▾ | |
|---|---|---|---|---|---|---|---|
| INVITATIONS | | | | | | | |
| RECEIVED | | RECIPIENT | FIRM | NOTE | | STATUS | REVOKE |
| OCT-02-00 | 10:56 AM | J. CONSTANTINE | JP MORGAN | DO YOU COVER ANY OF THESE: AOL, CMGI, XLA? | | PENDING | ☑ |
| OCT-01-00 | 09:16 AM | B. FADOR | CSFB | LOOKING FOR INFORMATION ON COMPANIES BUILDING DNA CHIPS | | PENDING | ☐ |
| SEP-28-00 | 10:18 AM | T. BREMNER | LPL FINANCIAL | OFFERING NEW COVERAGE IN EMERGING MARKETS | | DECLINED | ☐ |
| SEP-27-00 | 04:18 AM | J. GREEN | JEFFERIES SECURITIES | OFFERING NEW COVERAGE ON P2P FINANCIALS SYSTEMS | | PENDING | ☐ |
| SEP-27-00 | 03:34 PM | J. NIXON | JP MORGAN | WE HAVE NEW MODELING ANALYSTS THAT I'D LIKE TO HOOK YOU UP WITH. | | ACCEPTED | ☐ |
| SEP-27-00 | 03:34 PM | J. BERLIN | PUTNAM | HI JACOB, I WANTED TO INVITE YOU TO WS NET. IT'S EASY TO SHARE STUFF. | | PENDING | ☑ |
| SEP-26-00 | 12:05 PM | B. SHATNER | FIDELITY | HEY BILL, LET ME KNOW IF YOU GET THIS. WE CAN SHARE TIPS | | PENDING | ☐ |
| SEP-23-00 | 10:05 AM | K. MARTINEZ | WARBURG DILTON READ | I'D LIKE TO OFFER YOU OUR COMMENTARY ON A WIDE RANGE OF SECTORS. PLEASE ACCEPT. | | ACCEPTED | ☐ |
| SEP-22-00 | 01:25 PM | S. PATEL | CREDIT SUISSE BOSTON | WELCOME TO THE WORLDSTREET NET! | | DECLINED | ☐ |
| SEP-21-00 | 12:15 PM | C. YOUNG | ABN-AMRO | OFFERING NEW COVERAGE IN EMERGING MARKETS | | PENDING | ☐ |
| # OF INVITATIONS | | | | | | 5:21 PM | |

FIG. 18

| NEW INVITATION | | | CANCEL |
|---|---|---|---|
| NEW INVITATION | | | |
| FIND USER | | | |
| BROWSE NET | | | |
| SUBJECT | WE ARE EXCITED TO OFFER YOU FREE ACCESS TO OUR RESEARCH | | |
| | | SEND | |

FIG. 19

| TESTFORM | | | ☒ |
|---|---|---|---|
| WS NET DIRECTORY | | | |
| WS NET | | | DETAILS INVITE |
| | NAME | TITLE | |
| | | | |
| MY RELATIONSHIPS | | | |
| MY CONTACT LISTS | | | |
| NON-RELATIONSHIPS | # OF INDIVIDUALS | | |

FIG. 20

| WORLDSTREET NET DIRECTORY |
|---|
| WORLDSTREET NET PEOPLE FINDER |
| ENTER THE FULL OR PARTIAL FIRST OR LAST NAME OF WORLDSTREET NET USER YOU ARE LOOKING FOR |
| [_____] [GO] |
| |

FIG. 21

DETAILS

DETAILS FOR GORDON R. GECKO (GECKO INDUSTRIES)

BUSINESS CARD | INTERESTS | CONTACT LISTS | PACKAGES SENT | PACKAGES RECEIVED

---

JANUS — GORDEN R. GECKO

PRESIDENT & CEO

TEL: (212) 653-2163
FAX: (212) 653-2504

EMAIL: GRGECKO@GECKO.COM

PERSONAL DESCRIPTION:

GRADUATED FROM OXFORD IN 1982. MASTERS IN FINANCE IN 1992. I AM A THOUGHT LEADER IN THE FIRM FOR WIRELESS AND INTERNET TECHNOLOGIES.

VOTED IN TOP 5 EUROPEAN FUND MANAGERS 3 YEARS RUNNING.

☐ ACCEPT ALL PACKAGES FROM GORDON GECKO

END RELATIONSHIP    INVITE

CLOSE

FIG. 22

WORLDSTREET NET STATISTICS

MOST ACTIVE
- TOP TICKERS
- TOP SECTORS
- TOP AUTHORS
- TOP FIRMS

PUBLICATION
COVERAGE GAP

MOST ACTIVE TICKERS | LAST 24 HOURS ▾ | CLICKED BY ALL WS NET ▾ | SHOW TOP 10 ▾ | CLOSE

| RANK | AUTHOR | PACKAGES | CLICKS | RATIO |
|---|---|---|---|---|
| 1 | L. HARVEY | 123 | 2302 | 80% |
| 1 | D. HINGIS | 89 | 2092 | 16% |
| 1 | S. KRAFT | 132 | 2032 | 23% |
| 1 | C. HARPER | 142 | 1982 | 76% |
| 1 | W. BALLMER | 24 | 1682 | 86% |
| 1 | G. GECKO | 67 | 1873 | 49% |
| 1 | J. RUSSELL | 87 | 1862 | 77% |
| 2 | J. RUSSELL | 155 | 1362 | 24% |
| 2 | R. DIAZ | 73 | 1322 | 71% |
| 3 | D. HINGIS | 22 | 1098 | 48% |
| 3 | R. DIAZ | 85 | 1202 | 22% |
| 3 | S. LECLAIR | 17 | 1065 | 76% |
| 4 | K. SULLIVAN | 62 | 982 | 47% |
| 4 | C. HARPER | 49 | 941 | 81% |
| 5 | R. HICKS | 38 | 873 | 75% |
| 6 | H. CARPENTER | 91 | 865 | 78% |
| 6 | K. SULLIVAN | 25 | 821 | 65% |
| 6 | V. LALEV | 12 | 787 | 98% |
| 7 | B. SHEA | 18 | 745 | 43% |
| 7 | S. SHEA | 38 | 714 | 12% |
| 8 | P. HENDERSON | 72 | 563 | 9% |
| 9 | D. MEDELSON | 43 | 493 | 65% |
| 9 | S. LECLAIR | 32 | 451 | 72% |
| 10 | R. CONSTANTINE | 39 | 445 | 12% |
| 10 | S. FITZPATRICK | 98 | 1402 | 13% |
| 10 | R. CONSTANTINE | 60 | 1520 | 62% |

ELECTRONIC COMMERCE INFRASTRUCTURE SYSTEM

CROSS-REFERENCE TO RELATED APPLICATIONS

This application is a divisional of U.S. patent application Ser. No. 11/873,998, filed Oct. 17, 2007, now U.S. Pat. No. 8,010,412, which is a continuation of U.S. patent application Ser. No. 09/697,024, filed Oct. 25, 2000, now U.S. Pat. No. 7,287,089, all of which are incorporated herein by reference, and is related to two U.S. Patent Applications: U.S. patent application Ser. No. 09/696,765, filed Oct. 25, 2000, now U.S. Pat. No. 7,305,360, and U.S. patent application Ser. No. 09/696,754, filed Oct. 25, 2000, now U.S. Pat. No. 7,330,830.

FIELD OF THE INVENTION

The invention is directed to methods and apparatus for managing information relating to the subject matter of commercial transactions.

BACKGROUND OF THE INVENTION

Individuals involved in purchasing, outsourcing, and other business-to-business interactions must generally understand and select products and services for their organizations from a variety of competing entities. These individuals currently base their decision making on information obtained from a wide variety of sources, including face-to-face meetings, paper publications and telephone conversations. They can also consult information that is available electronically, such as databases, provider web sites, and so-called portals. For example, inferior partners may be selected for business relationships to avoid the high costs of searching out better partners.

Once businesses have contracted for a transaction or relationship, typically information must be exchanged many times between individuals, between software systems, and between individuals and software systems. These information exchanges may also occur through a wide variety of mechanisms, including face-to-face meetings, paper publications, and telephone conversations. Again, collecting, managing, and making sense of this abundance of assorted information can be costly and time-consuming. And the quality of the business relationship often suffers because of these high costs.

SUMMARY OF THE INVENTION

This invention includes a number of aspects related to the versatile sharing of information between users over a network and to the technical framework that makes these operations possible.

Systems according to the invention are beneficial in that they can provide access to actual data, rather than static "pictures" of data, as do a variety of current World Wide Web representations, such as those that employ hypertext markup language (HTML). Unlike the Web, systems according to the invention can enable intelligent software systems at the receiving as well as the publishing end of a connection. Because the actual data is available and can be manipulated and transformed by the receiving system, the system enables arbitrary transactions between users—both human users and software system users. These transactions can include any exchange, distribution, purchase, or sale of information, or group of such transactions. And systems according to the invention can even provide support for unanticipated interactions, with users negotiating the character of their relationships, and the software accommodating the resulting arrangement.

Systems according to the invention also benefit from their distributed but unified nature. Rather than dealing with the separately designed web sites of a number of different institutions, the user can deal with a single, unified interface for interactions with each of them. This can save a substantial amount of time and effort involved in understanding and using the different custom interfaces presented by the different institutions. And because information is distributed throughout the system, each firm and user can retain control of its information.

Systems according to the invention can also help to optimize the tradeoff between protection of the privacy of buyers and the benefits of the feedback that they provide to sellers, in an unobtrusive and straightforward way. This can result in increased usage of the system by users who might otherwise be uncomfortable divulging substantial amounts of personal or proprietary information to a variety of individual providers. Systems according to the invention can also allow for the movement of information to a central system for processing, when appropriate, or the movement of processing to the site of the information, when information security is more important. And by collecting statistics and billing information from the system as a whole, systems according to the invention can provide important feedback to its users and enable commerce in information.

Systems according to the invention can also provide the advantage of simplifying interaction across corporate firewalls. Once a system according to the invention is installed, it can allow for secure but feature-rich communication with a variety of parties. Unlike conventional security systems such as firewalls, which secure data geographically into an open inside and a closed outside, systems according to the invention can secure individual data-elements, associating with each data-element a set of authorized recipients and providing secure authenticated delivery. This level of secure, feature-rich interaction has often been unavailable or highly expensive because of the complexity and difficulty of setting up such systems between even a single pair of users.

BRIEF DESCRIPTION OF THE DRAWINGS

FIG. 12 is a screen view of an inbox window for the system of FIG. 1;

FIG. 13 is a screen view of the inbox window of FIG. 5 in group mode;

FIG. 14 is a screen view of an outbox window for the system of FIG. 1;

FIG. 16 is a screen view of a bundle creation window for the system of FIG. 1;

FIG. 17 is a screen view of an invitations received window for the system of FIG. 1;

FIG. 18 is a screen view of an invitations sent window for the system of FIG. 1;

FIG. 19 is a screen view of a create invitation window for the system of FIG. 1;

FIG. 20 is a screen view of an address book window for the system of FIG. 1;

FIG. 21 is a screen view of a people finder window for the system of FIG. 1;

FIG. 22 is a screen view of a business card details window for the system of FIG. 1;

FIG. 24 is a screen view of a most active statistics window for the system of FIG. 1.

DESCRIPTION OF AN ILLUSTRATIVE EMBODIMENT

Figure 1:
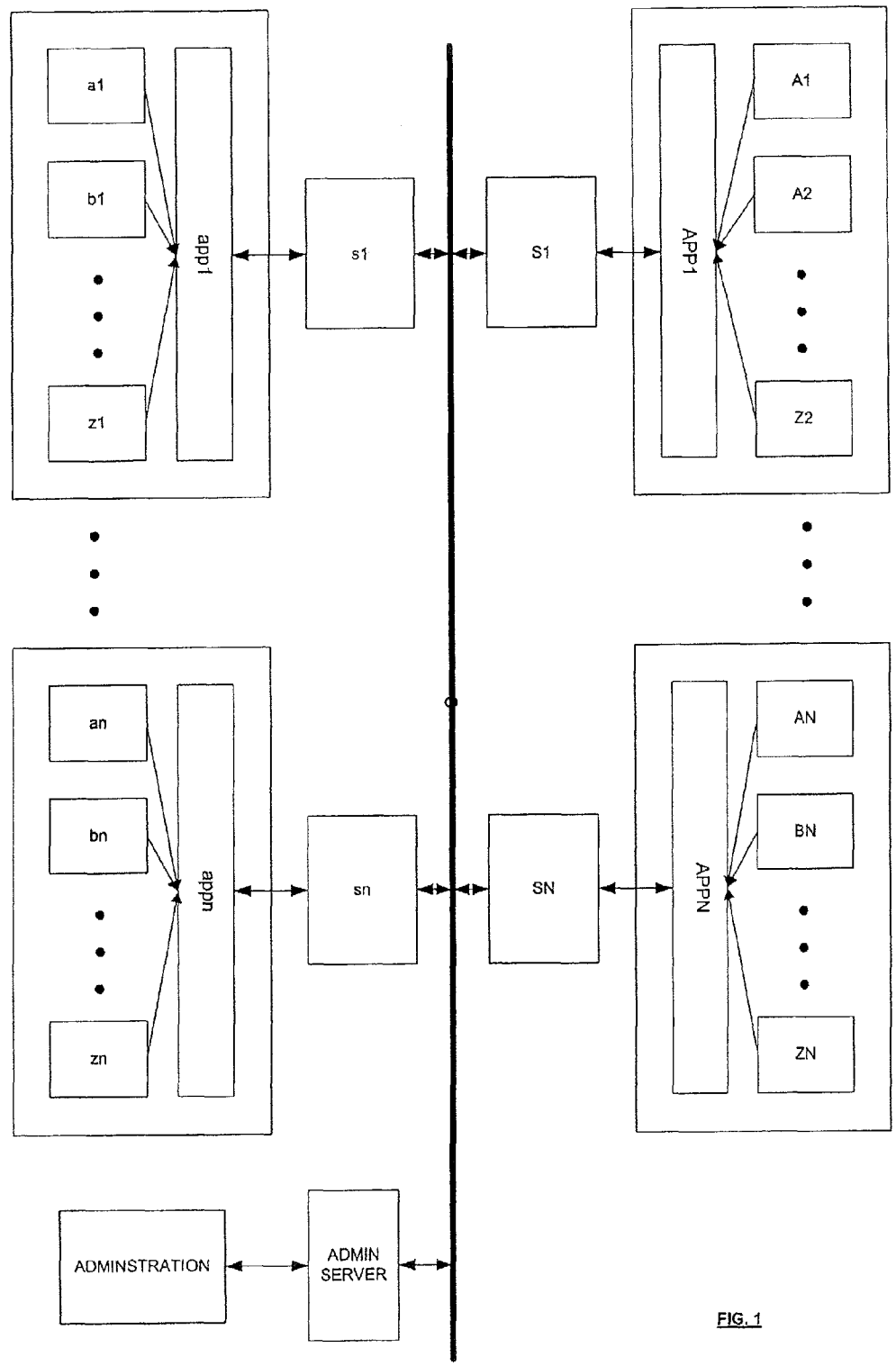
FIG. 1 is a high-level block diagram for a sales system according to the invention.

Referring to FIG. 1, an illustrative system 10 according to the invention interconnects a series of sell-side user terminals a1, a2 . . . an; . . . n1, n2 . . . nn belonging to one or more sell-side firms a . . . n with a series of buy-side user terminals A1, A2 . . . An; . . . N1, N2 . . . NN belonging to one or more buy-side firms A . . . N via one or more networks 12. Although other network communication paths can exist between these users, a series of networked aggregation servers (AGS) s1 . . . sn; S1 . . . SN preferably provide a system interface to one or more applications layers app1 . . . appn; APP1 . . . APPN run by the users. These servers each correspond to one of the firms and are located at firm-controlled sites in the embodiment presented, but they can also be distributed in other ways. Large firms might use multiple aggregation servers, but most firms would probably use only one. Small firms can share aggregation servers.

In this embodiment, the aggregation servers interact with an administrative organization 14 through one or more administrative servers 16, which provide value-added services to the community. Depending on the types of services to be provided, some of the functions of the administrative server could also be located within one or more of the aggregation servers.

Note that while many applications will provide for different functionality at buy-side and sell-side terminals, this distinction may not always be a useful one. Applications can be developed in which individual users have access to both buy-side and sell-side functionality, for example. And user interface systems may also be developed for commerce areas in which buyer and seller roles are less clear. In some systems, every user might have the option to use a customized application with a different feature set. In addition, while a number of examples relating to the investment industry are provided within this application as an aid to understanding the invention, this should not be understood as restricting the application of more general principles according to the invention to this area.

The system 10 is implemented using personal computers as user terminals. These terminals are networked through the firm's local area network (LAN) or wide area network (WAN) or across an external network (Extranet or Internet) with application servers, which themselves link to the aggregation servers. These various servers may reside together or separately on one or more server-class machines. The aggregation servers may be located within the firm's wide area network (WAN), or outside the corporate network in an installation shared with other firms. Servers can be interconnected via one or more, preferably private, networks, such as a value-added network (VAN), or a virtual private network (VPN) operating through the Internet, or over the public Internet. Alternative implementations are also possible, however, such as systems that employ standard dumb terminals, special-purpose terminals, or wireless personal data assistants (PDA's) as the user terminals, for example, and/or systems in which the organization and selection of network elements is varied in a number of suitable ways.

The system provides an infrastructure with a single electronic channel for all message types, including voicemail messages, text, and rich formatted electronic documents that can include subdocuments of varying types—e.g. a text-based HTML file, an Adobe pdf file, a graphical chart, an audio file, and a movie. Each message is called a "bundle." A bundle is categorized by a rich and user-extensible set of meta data, describing the bundle's content and specifying who is authorized to receive it. Tools can be provided by the administrative organization to construct arbitrary bundles.

Figure 2:
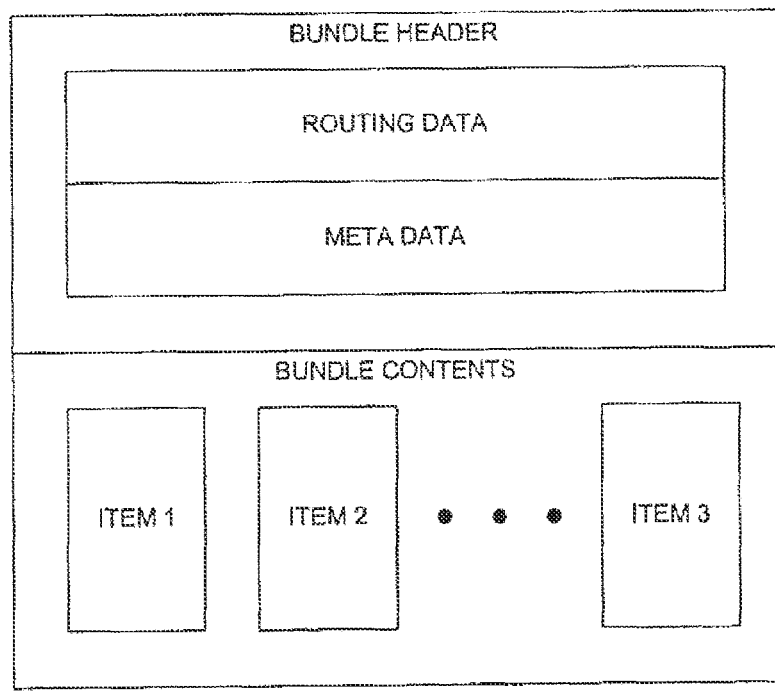
FIG. 2 is a software interaction diagram for the system of FIG. 1.

Referring to FIG. 2, bundles include two major parts, a bundle header and contents. The header includes routing data and meta data. The routing data specifies a destination address for the bundle that allows the aggregation servers to deliver it. The meta data include a series of item descriptors and values for the items. Some of the meta data items are required, and others can be customized. The contents can include different types of documents, or a reference to these documents within the network.

Bundles can be implemented using a language that permits the users and/or application developers to define their own data types, such as eXtensible Markup Language (XML). For example, the XML Data Type Definition (DTD) for a bundle might include a Root Element called "Bundle". It would have further Elements called "Targets," to specify who is authorized to read the bundle, and "BLDs," to specify the descriptive metadata of the bundle. Attributes of the bundle Element might include items such as ID, author ID, headline, and creation date. Attributes of the Targets Element might include information such as a recipient ID, a recipient name, and a recipient firm ID, etc. Attributes of the BLD Element might include keys and values. Although packages following the general outline presented in FIG. 2 are quite powerful, other types can be defined, such as an invitation.

Figure 3:
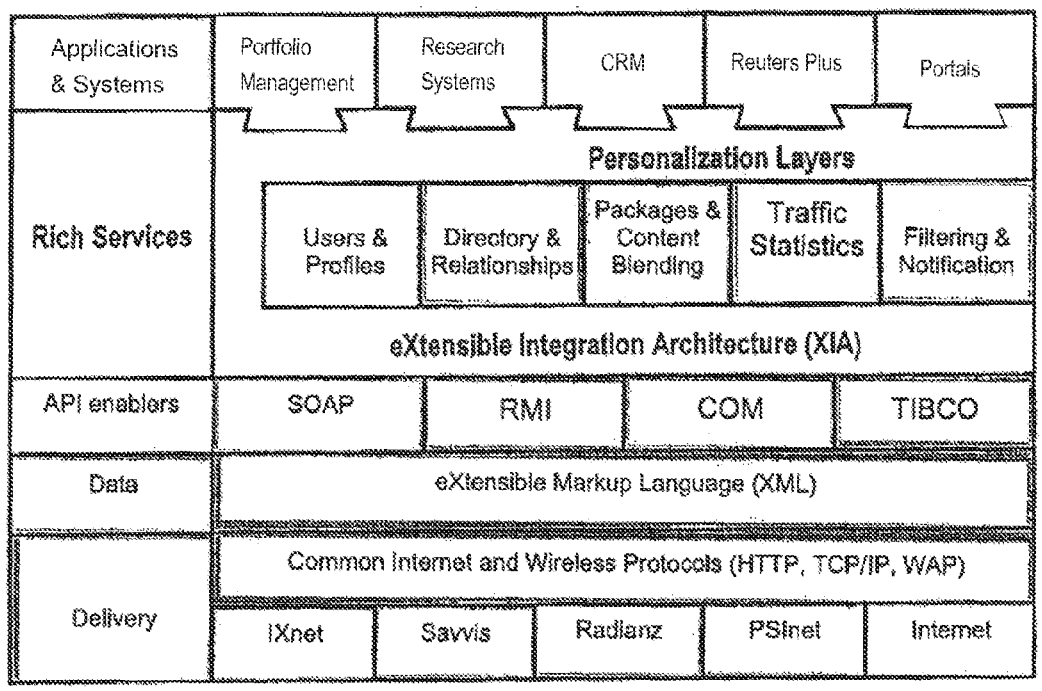
FIG. 3 is a high-level block diagram of a bundle for the system of FIG. 1.

Referring to FIG. 3, user interface applications running on the user terminals and other systems and applications within the firms will generally interact directly or indirectly with the infrastructure provided by the aggregation servers through an extensible integration architecture (XIA). This architecture provides a number of integration points and event channels that facilitate information sharing. The applications that interface with XIA can be provided by the same organization that administers the aggregation servers, by personnel of the firm that uses the server, or by third party consultants.

There are three connection points for XIA that enable different types of interactions with core infrastructure services The first is the XIA API, which is an Application Programming Interface (API) that is exposed as a local COM component or as a remote service via SOAP. This provides an interface for instantiating a set of objects, such as a bundles or users, to allow applications to create and interact with these system objects. The second connection point is the XIA alerts, which are asynchronous messages are published via TIBCO Rendezvous to distribute alert-style messages. These can be user-focused, such as the notification of bundles to a wireless device, or Simple Network Management Protocol (SNMP) type messages sent to an admin console. The third connection point includes XIA triggers. These are events that may cause cascading processes to take place on a aggregation server. XIA triggers can connect to other systems and applications synchronously or asynchronously to perform their defined set of tasks.

Whereas the three access points described above define the inputs and outputs of aggregation server, XIA's event tables dictate the internal process flows of any sort of XIA activity. Event tables can preferably be defined at extremely fine grained levels based on a combination of things such as bundle type, destination address, author, user role or even user definable properties. Each event table provides a sequence of activities with priorities, dependencies, execution methods and requirements for any action on any object managed by a aggregation server.

Content blending is an example of how an XIA event table is put to use at both endpoints of the system. When the XIA API publishBundlemethod is called, an XIA event table is located for the specific bundle type and destination address and executed like a job sequence. The table may define that synchronously, a local COM call must be to a compliance system to allow publication of this material. Next an asynchronous call may be made to a research system on a separate server to request the latest research on this topic. Once the synchronous actions are complete, the meta data is published to the network.

When the meta data reach a recipient's aggregation server, it can cause an XIA table to be triggered that sends out an XIA alert via Rendezvous to a notification system that passes the meta data on to a wireless device using WAP (see Table 1).

TABLE 1

| Step | System | Call | Wait |
|------|--------|------|------|
| 1 | Template | COM | async |
| 2 | Compliance | SOAP | sync |
| 3 | Research | RMI | sync |

When a recipient requests a bundle, their workflow application can call the XIA API fetchBundlemethod. This can cause a local XIA table to be executed that may replace or augment core filtering services, such as requesting information from a local compliance server to determine if a buy idea on ACME would not be possible based on the prospectus definition of the funds being managed by the user—therefore preventing the user from even seeing the idea. Additional content blending can also be driven by an XIA table based on author and bundle type causing asynchronous requests for system statistics on the topic and the top five news headlines on the topic from a local news feed.

Security and user authentication is another example of how local XIA functions can be completely substituted via customization of XIA tables. The standard sequence for an XIA login request can be entirely removed and replaced with a client-specific authentication sequence that validates a user. This process results in the generation of a token that can be passed to a aggregation server, which will match it with a server side token to validate the user. This requires customization of the properties of the user object to store the appropriate token information, and, therefore, system net objects have extensible properties that can be augmented for different integration projects. Unless both client and server side security definitions are in synchronicity, user validation is not complete and will not be allowed.

The XIA can be configured to operate in either of two modes. The first mode is called synchronous mode. In this mode, the XIA passes control of the document to the external system to perform the necessary operation. Control and processing does not resume until the external system calls back into the aggregation server and modifies the document status. At this point, control is transferred back to the XIA engine. The second mode is called asynchronous mode. In this mode, the external system is notified that a document is passing through the system and that the external system can start some parallel processing if desired or if necessary. The XIA continues to process the document, and the external system has limited access to the document as it "passes by".

XIA also permits existing desktop applications to be adapted to interact with other users in the community by embedding custom components. This can allow many users seamless access to the collaboration power of the infrastructure, without having to leave their workflow. For example, sell-side traders might use a standard trading terminal, such as a Reuters® XTRA terminal, that has been enhanced with an embedded component that can interact with XIA; salespersons might use a standard contact management application, such as Microsoft Outlook, enhanced in the same way. Using such an application, these users can create and receive system bundles as they would any other type of data within the standard environment.

XIA is more than an application programming interface (API) set. With general purpose API's, the external system passes a set of parameters and a function name to the core system and the core system executes the function on behalf of the external system. With XIA, however, control can be relinquished to the external system to implement the function in whatever manner it chooses. The embodiment supports interactions between external systems and aggregation servers through XIA via three standard communications protocols. Microsoft's component object model/distributed component object model (COM/DCOM), TIBCO's Rendezvous messaging system, and Microsoft/IBM's SOAP (Simple Object Access Protocol). Other technologies that could be supported include Sun Microsystems's Remote Method Invocation (RMI) and Common Object Request Broker Architecture (CORBA). These technologies are well defined in a variety of publicly available documents readily understood to one of ordinary skill in the art.

As information moves through the system from user desktops through applications to aggregation servers, across the network to other aggregation servers, and back to client desktops via applications, XIA enables various functions and events to occur at the interface between aggregation servers and applications. Systems that interact with XIA are generally of two types, 1) those that replace, augment, and/or modify functionality of the aggregation server, such as sell-side compliance engines and content blending, and (2) applications that create a user interface for users, enabling them to create and receive bundles.

XIA processes enable external systems to add value to the information as it passes by (called content blending), enable modification of the functionality of the aggregation server, and can provide notification of events to appropriate external systems. For example, the system can allow users or user firms to blend additional content into a bundle at different points in the system, including the creator's firm aggregation server, the system's core infrastructure, and/or the recipient's firm aggregation server. User applications can also allow for blending at the sender's and/or the recipient's desktop.

The added content can be from any compatible data source and can be added on as a layer to the bundle. It can be added as a snapshot of the content at creation of the document, or as a reference to the content, such as an hypertext transfer protocol (HTTP) reference. Content blending can also be user-specific, with entitlements being stored in the aggregation servers. The addition of content can be performed by building a super bundle around the existing bundle or by transforming the bundle.

In one example, a salesperson at a sell-side brokerage firm prepares an investment bundle about an upcoming conference in San Francisco on the "Tech" sector for a portfolio manger at a buy-side firm. From within his internal research system, he then adds the latest industry report and model to the bundle, and sends it. In a first level of content blending, the sell-side firm automatically tags the bundle with its legal disclaimer as it passes through its aggregation server. A second level of content blending occurs when the bundle arrives at the system's core infrastructure and it detects that the sell-side firm has requested the addition of a weather forecast to the bundle, and determines that the buy-side firm is a subscriber of a particular weather content service. This detection causes a weather forecast for San Francisco from this service for the given dates to be added to the investment bundle. A final content blending level occurs when the bundle arrives at the buy-side firm's aggregation server, but before it reaches the recipient's terminal. At this time, the firm's aggregation server detects that the bundle is tagged with the Tech sector, and adds the latest Tech sector report from the buy-side firm's analyst from one of their internal systems.

In another example, a salesperson at a sell-side firm creates a bundle for a buy-side firm about online auction sites. She tags the bundle with five equities and indicates that the most recent estimate and recommendation for those equities should be displayed in the bundle. Because the sell-side firm has plugged their research database into their aggregation server through XIA, simply opening the bundle will provide access within the bundle to estimate and recommendation information from the research database.

In a further example, a firm has subscribed to a news service offered by the administrative organization. Any bundle received by this firm will contain the latest five reports on the tagged equities.

In another example, a buy-side firm does not want its portfolio managers wasting time on bundles tagged with equities that their analysts have a 'sell' recommendation on. To help avoid such problems, they can program their aggregation server to display their internal analyst recommendation for every equity a bundle is tagged with.

In a further example, when a salesperson receives a bundle from an internal source (e.g., an analyst), she would like to see a list of potential contacts that would be interested in the equities that bundle is tagged with. Many functions that can be implemented in applications that interact with XIA are presented in two copending applications entitled "Methods And Apparatus For Managing Information Relating to Subject Matter of Commercial Transactions," filed May 18, 1999, Ser. No. 09/313,829, and "Event Information Management System," filed Aug. 9, 1999, Ser. No. 09/370,671, both of which are herein incorporated by reference.

Functions that applications provide to XIA can also allow the aggregation server to perform notification tasks. When a condition specified in a function is detected, such when a bundle is detected as relating to a particularly volatile security, XIA can initiate a notification process associated with the function. These processes can range from requesting that a destination terminal issue a more noticeable alert window to the initiation of a pager message.

Figure 4:
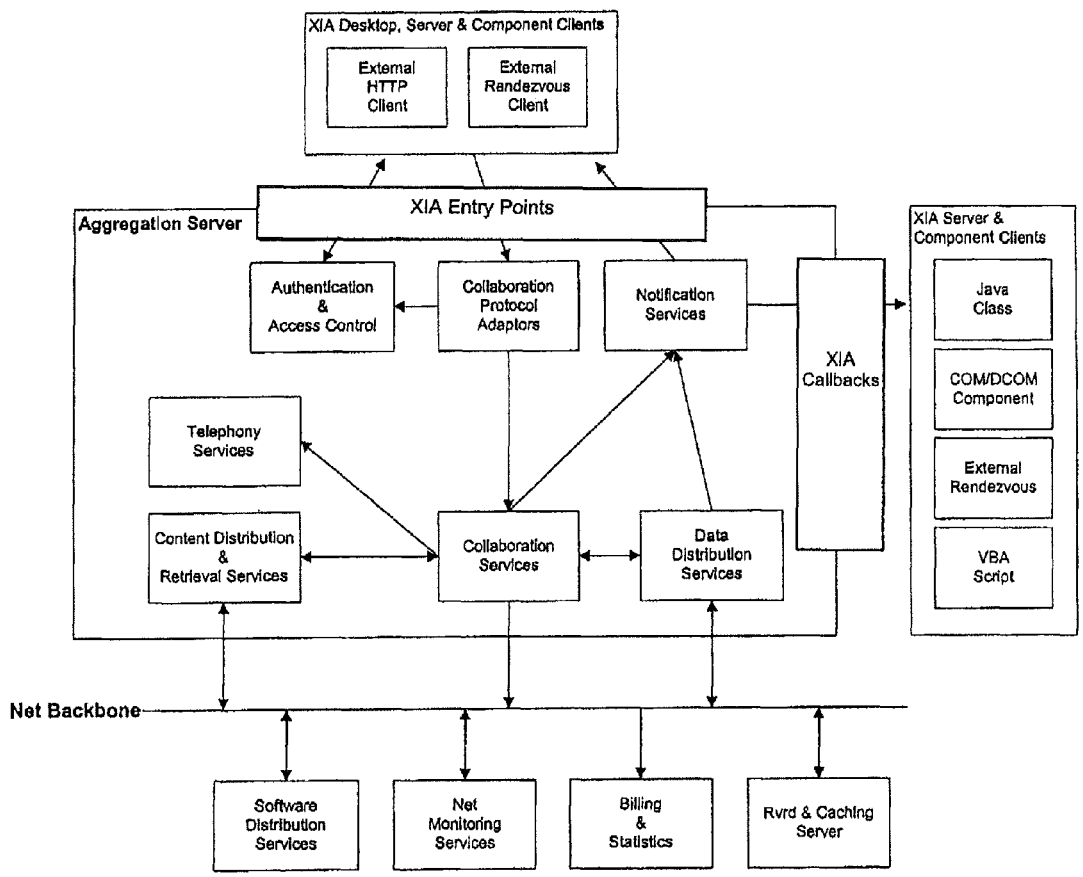
FIG. 4 is a more detailed block diagram for portions of the system of FIG. 1.

Referring to FIG. 4, the architecture of the system will be discussed in more detail. As shown in the figure, an aggregation server can include six separate functional modules, including authentication & access control, collaboration protocol adapters, notification services, telephony services, content distribution & retrieval services, collaboration services, and data distribution services. The function and structure of these modules can also be broken down in different ways than those shown in figures, however, with logic elements being combined, separated, or recast as appropriate.

Collaboration Services is a collection of business logic and persistence application services for managing collaboration objects and documents. It includes objects like Users, Business Cards, Relationships, Firms, Groups, Bundles and Inboxes, and provides standard XML DTD's for these objects. Each service fulfills a specific task or a set of tasks that work with other services in an interoperable manner to carry out their part of a complex workflow or a business transaction. Collaboration Services provide the core functionality of an Aggregation Server (AGS). XIA provides the toolkit for integrating client applications with the Collaboration Services.

XIA Service API's provide a HTTP/SOAP interface to Collaboration Services. XIA client applications use these interfaces (e.g. API's) to request data and to perform transactions. It can reside on or off an AGS. XIA Triggers allow customized notifications and actions to be performed when data changes on an AGS. An XIA Trigger use case would be support for a compliance module which checks every outgoing bundle for restricted securities and block the bundle from being distributed. XIA Triggers are implemented in through Java class instantiation and method invocation. Specific trigger implementations can then use Java directly or use COM, Tibco Rendezvous, VBA/VBS scripts or another protocols/toolsets that can be invoked from Java. Typical clients will be COM/DCOM/RMI/CORBA/SOAP components/services and Rendezvous server processes. Triggers can be developed and configured differently on each AGS to meet specific customer requirements.

XIA Alerts provide asynchronous delivery of changes to specific Collaboration Services business objects. Tibco Rendezvous messages are used to deliver the changes, which are bundled as XML documents. An XIA Alert use case would be support for delivering an Inbox notification to a user's PDA. Custom XIA Alert clients can subscribe to specific alerts and process the data as needed. XIA client applications use the Services API's or the COM API's to receive XIA Alerts.

XIA COM API's provide a COM interface to Collaboration Services. It resides off an AGS and communicates with the AGS via the XIA Service API's. Clients are typically client desktop applications (i.e. Notes, Outlook, Reuters). XIA client desktop applications also require notification of events/alerts. Lightweight (e.g. no rvd) client-side Rendezvous is used to deliver XIA Alerts to the XIA COM API's. Alerts are then delivered as COM Events to clients through the XIA COM API's.

Content Distribution Service allows content to be retrieved from a remote AGS and blends in data added through the XIA Triggers. Data Distribution Service (DDS) keeps many distributed data stores synchronized. It supports the concept of data objects "living" in multiple places throughout the Net. DDS distributes and guarantees latent consistency of objects throughout the entire Net. Data Compatibility Services provide data adaptors and XML DTD's for transforming Net XML data from one revision to another. It resides on every AGS. Telephony Services provides allows voice mail messages to be attached to Bundles. Billing and Statistics is a set of information services residing on the Net Backbone. As Collaboration Documents (e.g., business objects represented as valid XML documents) pass though the Net as Rendezvous message, it listens for these messages and updates its billing and statistics data accordingly. Billing data is processed through an accounting module. In one embodiment, a collaboration protocol adapter is provided to interface with external applications in a modular way.

Content Distribution, Retrieval & Blending Services ("fetch") will now be discussed in more detail. Note that fetch can be used in any distributed computing environment for data distribution.

The system is designed with groups of aggregation servers distributed throughout the globe all functioning as members of a larger community. Each aggregation group, and each server within each group serves as both an independent entity and a member of the larger community. There are two types of data that need to be distributed between aggregation servers (AGSs). Grouped meta-data (i.e., bundle meta-data) and the actual content that the meta-data describes. Fetch is wholly concerned with the content itself and is the framework for the storage and distribution of that data in a timely, secure fashion.

Fetch stores data, manages its storage space, and allows pluggable sources of content. By pluggable, it is meant that an interface is defined for a data-source. Third parties can thus implement that interface and act as a source of content for the system's community through fetch.

All communications, including content streaming, between Fetch services on different aggregation servers happens in Tibco Rendezvous (RV). Fetch generates a storage descriptor, which is an identifier that corresponds to a particular content segment stored by a Fetch service. This descriptor is globally unique. Fetch on any AGS can service requests for content identified by a storage descriptor generated by a different fetch service, which may be on another AGS.

Fetch is designed to be fault tolerant and scalable. Service times for requests are minimized to the extent practical. Fetch can handle many responses to a single request. Downstream caching can be incorporated. Fetch can also coordinate between fetch services on different AGSs but within an aggregation group. This will allow for one Fetch service to take over for another when they share a data source, and it is required for providing locking on data that can be modified so concurrent modification can be avoided.

Fetch has the ability to instantly retract content that was previously available. All content served is the most up to date version of that content if it has been modified. Content can be cached on foreign aggregation servers to improve performance. In addition, any AGS may specify that caching of its content is not allowed. Encryption of data in the foreign cache is incorporated so that even if physical access is gained, the data can not be deciphered, where performance allows. Fetch can store content but not distribute it to other fetch services. Information about content fetch is storing is available within the AGS and a subset of that information available outside the AGS. The operating properties of fetch can be modified without a restart, and can provide information on its performance and activities.

Designing fetch based solely on business rules would result in a strictly request/response system where any time that content is requested it is retrieved from its owner, allowing owners to maintain ultimate control over their data. The moment the owner decides to retract availability, nobody can get it. A system designed this way would have abysmal performance, however, because it would be needlessly sending large amounts of data across networks repeatedly.

Designing fetch based solely on performance considerations would result in the content being sent out by its owner once, with every recipient aggregation server caching and serving it on demand until the package it is associated with is deleted. This would result in the owner losing his ultimate control, his instant retraction capability. If the owner's AGS is functioning, but loses its network connection, it is possible for the owner to retract the package containing the content, but have the package content still available. This is unacceptable.

To resolve these issues, fetch uses intelligent caching and optimistic distribution with the use of release certificates. Content for which instant retraction is required, may be marked as requiring a release certificate. When content is in a foreign cache and a user on that aggregation server requests the content, fetch will not serve the cached copy until it obtains a release certificate from the owner of the data source that content came from.

In addition to release certificates, an additional property is provided. Any fetch service can be configured so that the content it distributes to other fetch services is marked as uncachable. This allows for an easily accommodated change in the business rules of an individual AGS regarding caching.

Some individual content segments may also be marked as uncachable. This is provided because it may be that the data source for a particular content segment is constantly modifying the content and therefore caching on foreign servers makes no sense. An updated copy will always be needed, so using cache space on the content is wasteful.

Distribution of content will now be discussed. There are three fundamental content status types that determine whether content can be distributed in the first place:
  Unregistered (Content is not distributed outside the AGS)
  Registered Private (Content is not distributed outside the AGS)
  Registered Public (Content is available to other AGSs)
Within the AGS, access is provided to all three types of storage plus the registered public storage of other fetch services on the net.

Content can be distributed in two ways:
  Request/response.
  Content Push.
If IOCD (Intelligent Optimistic Content Distribution) is enabled and the content itself is IOCD capable, the first request for that content triggers a content push so that all recipients of this data receive it for caching.

Moving the content to foreign servers with IOCD before it is requested results in a major performance gain in the following two ways.
  The content is physically read from its data source only once, unless it has fallen out of the cache on foreign servers and must be requested again.
  If a user is not the initial requestor of the content, it is likely that the data is already in his or her cache so the data transfer doesn't need to take place.

IOCD doesn't provide just on and off states, but rather can be configured to optimistically distribute certain content based on a set of rules. These rules are configurable on the fly and any property of content can be used in the rules. An example of rule syntax would be Distribute optimistically if:

(SIZE>=300K MIME-TYPE="application/worldstreetXclient" NUM-RECIPIENTS>3)

In addition to the requirement that instant retraction be made available regardless of network connectivity, it is also true that if one server goes down, content should remain available to recipients. This is handled through the concept of aggregation groups, which is a collection of aggregation servers acting both collectively and as individuals. Fetch accesses data in these groups through its data source concept. Allowing these data sources to be shared between aggregation servers gives us redundant access to the data.

Doing this efficiently and without overbearing configuration of services requires fetch to be able to determine the possibility of other servers accessing its data stores, but not who is accessing them or how many accesses take place. Fetch only needs to worry about others having access to its data sources in two well defined cases.

A client of a Fetch service wants to edit the properties of some content. Locking is provided.

A release certificate is issued by server A, but the foreign fetch service decides to use server B to serve the content because its response was three times faster, server B has to know that the release certificate it is being given by the foreign fetch service is actually valid (it was issued by the owner).

Locking in the first case and all servers (within the aggregation group) having access to release certificates issued are accomplished using a core fault tolerance service framework, which utilizes Tibco's Rendezvous fault tolerance concepts. With this Service framework, all method calls are turned into RV messages and broadcast to anyone else on the subnet running that service. Only the active service sends a response to the method call, but all instances of the service can opt to have their method called. This allows all services to remain in a consistent state.

The default installation of the system provides a default data source that uses a file system. In most cases this file system will be in the form of Network Attached Storage (NAS) and will be shared amongst all aggregation servers in the group.

While many products provide different types of replication technology, such as database products, or synchronization methods, such as LDAP vendors, the system provides a unique method for ensuring all servers within the community are kept up to date with the right set of data—the Data Distribution Service (DDS). There are four conceptual pieces to DDS that interact to ensure Objects are stored, deleted and distributed appropriately. These are:

Collaboration Services objects that are responsible for persisting their instances and publishing their stateful information to other aggregation servers.

The Database Schema consists of table definitions and attributes to serialize in memory objects to physical storage. The schema also includes database code in the form of Microsoft SQL Server stored procedures and triggers to support anticipated and ad-hoc queries. The diagram below illustrates the relationship between the collaboration services objects and the database schema.

The DDS engine, which is responsible for the publication and digestion of object activity such as the creation of new objects, changes to existing objects or the deletion of objects altogether. This consists of two parts, outbound service manager and inbound service manager, responsible for publication and digestion, respectively.

The Synchronization service ensures that all Aggregation servers receive and process object activities in the correct sequence. Consisting of schema related data, such as GUIDs and VIDs, and managers, such as the Retransmission Service as well as capabilities within the Inbound Service Manager, this guarantees that all information is processed in sequence.

The illustrative DDS framework presented here has been designed to meet a number of business and technical requirements. As with the other aspects of this system, there is room for a variety of changes in these requirements, given different business objectives for the system and technical constraints outside of the scope of the invention. The requirements in the present embodiment fall into three categories, requirements within an aggregation server, requirements within an aggregation group, and requirements between aggregation groups.

Within an aggregation server, it must be possible to make changes to the local database either through application logic, or through ad-hoc queries. In both cases, VIDs, GUIDs, Originators, and Timestamps must be properly maintained, and remote servers must find out about the changes. It may be necessary to trigger other, Business Logic defined, actions in several DDS-related scenarios. Some places where these hooks might be useful: before saving a local object, after saving a local object, or after saving a remote object. The hooks which occur before saving a local object should have the ability to abort the save or modify the object.

Within an aggregation group, all servers within an aggregation group must maintain the same data (possibly with a small time lag.) An aggregation group must be able to scale to an arbitrary number of users, and span an arbitrarily large geographical region. It must be possible for users to have shared modification access to objects owned by the group. It must be possible for these users to be on separate machines, and, potentially, in separate geographical locations. When two users make concurrent modifications to an object on separate servers, there must be a deterministic decision made as to who's modification is accepted. All servers must agree on this determination. If an object is modified after another user retrieves it but before he resaves it, a best effort should be made to ensure that any changes the user makes are rejected and the user is notified that they had a "dirty" copy of the object. If a server fails, it must be possible for other servers in the group to gracefully take over for it. In any failure scenario, it must be possible to bring all of the servers back up and resync with each other The results of this resyncing must be predictable, reasonable, and consistent. All servers must contain the same data after the resyncing, and any data that is visible remotely must be in a consistent state on remote machines. It must be possible to load balance users between the aggregation servers. There should not be any single point of failure in an aggregation group. The servers within a group should operate independently. One server should not be a bottleneck for transactions occurring on other servers. It may be necessary to save an object in a state which should be published to the group, but not seen by the network.

Between aggregation groups, an aggregation server must be able to maintain consistency with data owned by remote aggregation groups. An aggregation server should only be able to modify data that it's group owns. When synchronization is lost, a best effort should be made to avoid network "floods" in the resynchronization phase. It should be possible to synchronize some data across a local aggregation group without exposing the data to any other aggregation groups. Business objects in DDS should be represented as XML documents. These documents may be used outside of DDS. The XML formats used or a given type of object may change over time. It must be possible to have different aggregation groups running different versions of the software. Conversions between the old and new XML formats must be automatically handled.

The following use cases illustrate the operation of the DDS.

- A user inserts an object through XIA as an XML CD. A distributed object is instantiated from the CD. The object is sent through the notification engine where custom actions are performed. These custom actions may either veto the save or modify the object. The object is then saved to the database (possibly spanning multiple tables). The originator is automatically set to the local originator, a new GUID is automatically generated, and a new version identifier (VID) is retrieved from the VID service. After the object is saved, it is converted into an XML formatted CD which is broadcast to other aggregation servers in a TIBRV message.
- The synchronizer service receives a CD in a TIBRV message. A distributed object is instantiated based on the XML data. When the object is saved to the database, it is sent to the notification engine. Because it is a remote object, the notification engine can not modify it or veto the change. The object is not published, since it belongs to a remote home.
- A CD into the synchronizer service from an aggregation server running an older version of the software. The synchronizer service generates a class name based on the object type and the remote and local type version numbers. This class is loaded from WorldStreet and used to translate the XML from the old format to the new format. If the class is unavailable, it is assumed that the format is unchanged. Saving then proceeds as the previous use case
- A CD arrives into the synchronizer service with a higher than expected VID. Instead of saving the object, the synchronizer service sends a resync request to the remote server requesting all objects with VIDs higher than the last VID it received.
- A CD arrives into the synchronizer service with a lower than expected VID. (Perhaps because another server requested a resync). The CD is ignored.
- An local object is deleted. The delete is broadcast as a TIBRV message, and a reference to the deleted object is added to a _deleted_objects table with a new VID so that resyncs will hear about the deletion.
- A CD arrives into the synchronizer service which represents a local object. The object is already in the database, so it is ignored.
- The local install is upgraded. The server sends out a special resync request asking for all remote objects which were created by versions newer than the previous local version. (The local versions of these objects may not contain all of the data from the remote objects, since they had to go through a translation process before they were saved.) When the objects arrive, they are re-saved to the database. (There shouldn't be any notification, since this isn't really a change to the object, and they shouldn't be rejected as in the fifth use case, even though they have old VIDs.)

The database schema needs to be specially set up to support DDS. The first requirement is that every table in the database must have the following three columns:
    originator
    guid
    vid Each guid/vid pair is unique to a particular object. If the object is spread out over multiple tables (and even multiple rows in some of the tables), the same guid/vid will be in every row associated with that object. For each type/originator pair, a sequence of VIDs is maintained. Every time an object is modified, updated or deleted, a new VID is assigned from the sequence. These VIDs allow the synchronizer to detect missed updates and to retrieve the missing data. Because the sequence of VIDs must be shared between the application logic and ad-hoc queries, new VIDs must be retrieved from a separate VID service. (The VIDs could also be maintained by a stored procedure, but this would add extra database queries in the application logic.)

A table must be maintained which lists the local originator(s). This will be used by the application logic, the synchronizer service, and ad-hoc queries to determine whether objects are local or remote.

In order to support synchronization of ad-hoc queries and re-synchronization of deletes, triggers are needed on every table. (Except for the worker tables supporting DDS, such as _deleted_objects) These triggers need to make sure that when a table is modified through an ad-hoc query, a new VID is assigned and propagated to all related rows in related tables. It also needs to ensure that when an object is completely deleted (the entry in it's primary table is deleted) a row is added to the _deleted objects table with a new VID. An outline of the functionality of such a trigger follows:

Begin transaction
    If not an ad-hoc query, skip ahead. There are two ways we
        could discover whether this is an ad-hoc query: 1) each
        application process calls a stored procedure that enters
        its spid into a table which the trigger can validate against,
        or 2) the trigger can check the DBLIB_NAME of the
        process and check against some agreed upon string
    Get VID from trigger's inserted table. If new VID is already
        in _triggers table, then return immediately because the
        presence of the VID signals the fact that this table is
        being updated as part of another table's trigger
    Get unique VID
    Enter unique VID into _triggers table
    Update VID in all related tables
    Delete VID from _triggers table
    If this trigger was a delete AND the delete removed the
        "master" object (meaning the object no longer exists in
        the db) then this object must be added to the _deleted_objects table with a new VID.
    End transaction It may be possible to automate most of this process in a single stored procedure by maintaining a table of type relationships. Each row in the table would contain three pieces of information
    type_name
    table_name
    is_primary This would allow the stored procedure to find all related tables (by type_name) and to figure out which one is the primary table. It could also be used by the synchronizer service and the VID service to find out a list of types in the system.

The DDS engine provides an API for publishing and receiving TIBCO messages containing DDS content. It defines several types of messages (insert, update, delete, resync, version sync, and heartbeat) and interfaces and objects for publishing and receiving these messages. It does not define what actions are to be taken when a message is received, or where the content of published messages comes from. This is defined by the clients of the DDS Engine.

There can be six concrete message classes: InsertMessage, UpdateMessage, DeleteMessage, ResyncMessage, VersionSyncMessage, and HeartbeatMessage. There can be two controller classes: InboundController and OutboundController. These controllers take care of listening for/publishing messages. There can be several interfaces which can be registered with the controllers to customize the processing of/creation of messages. These include ChangeCommitter, ChangeFactory, and LastVersionFactory.

There needs to be a framework for building Distributed Business Objects. Business objects built upon this framework should support the following aspects of DDS with minimal effort by the business object developer.

Saving of business objects to the local database.

Conversion of business objects to/from XML format.

Connection to the Notification Engine before/after saving, and before/after publishing. (For efficiency, the notification process may be partly built into the business object classes themselves.) Objects may be modified or rejected in this process.

Publication of inserts/updates/deletes in TIBRV messages.

All Distributed Business Objects must have the following features:

They must have three identifying properties: originator, guid, and vid. The originator is used to specify the "home" of the object. The guid is used to uniquely identify the object across all servers on the Net. The vid is a version number for the object which is used to keep databases in sync. There is more information about these fields in the "Database Schema & Triggers" section.

New distributed objects must automatically generate GUIDs and automatically set the originator. They must also get their unique VID from the VID service.

Updated distributed business objects must automatically get new VIDs from the VID service.

Distributed business objects must be able to determine whether they originated locally or remotely.

Distributed business objects must be able to save themselves to the database. This will be based on the existing DBObject persistence framework.

It must be possible to look up distributed objects based on their GUID. This functionality will be based on the old DBObject persistence framework. The other static lookup methods from DBObject must also continue to work.

It must be possible to represent a distributed business object in XML format. There will be a default reflection based method available to all distributed objects, but individual types of distributed objects may wish to override this behavior using a custom DTD.

It must be possible to initialize a distributed business object from XML. There will be a default reflection based method available to all distributed objects, but individual types of distributed objects may wish to override this behavior using a custom DTD.

Each type of distributed object must contain a unique type name (by default, the class name) and a type version number. Any time the XML schema for the object changes, this version number must be incremented. This type version number will allow us to detect version mismatches and automatically discover version translators. This process should happen automatically if the converters are available on the network and the type version numbers are correctly defined.

The type name and type version number must be added to the TIBRV messages created by the DDS Engine so that the remote synchronizer can resolve version conflicts.

The distributed business object must communicate with the Notification Engine before/after saving and before/after publishing. The Notification Engine must be able to veto changes to local objects, and make modifications to local objects. These notification actions could potentially be registered locally with the distributed business object's class to avoid the network overhead of talking to a standalone notification engine.

Figure 5:
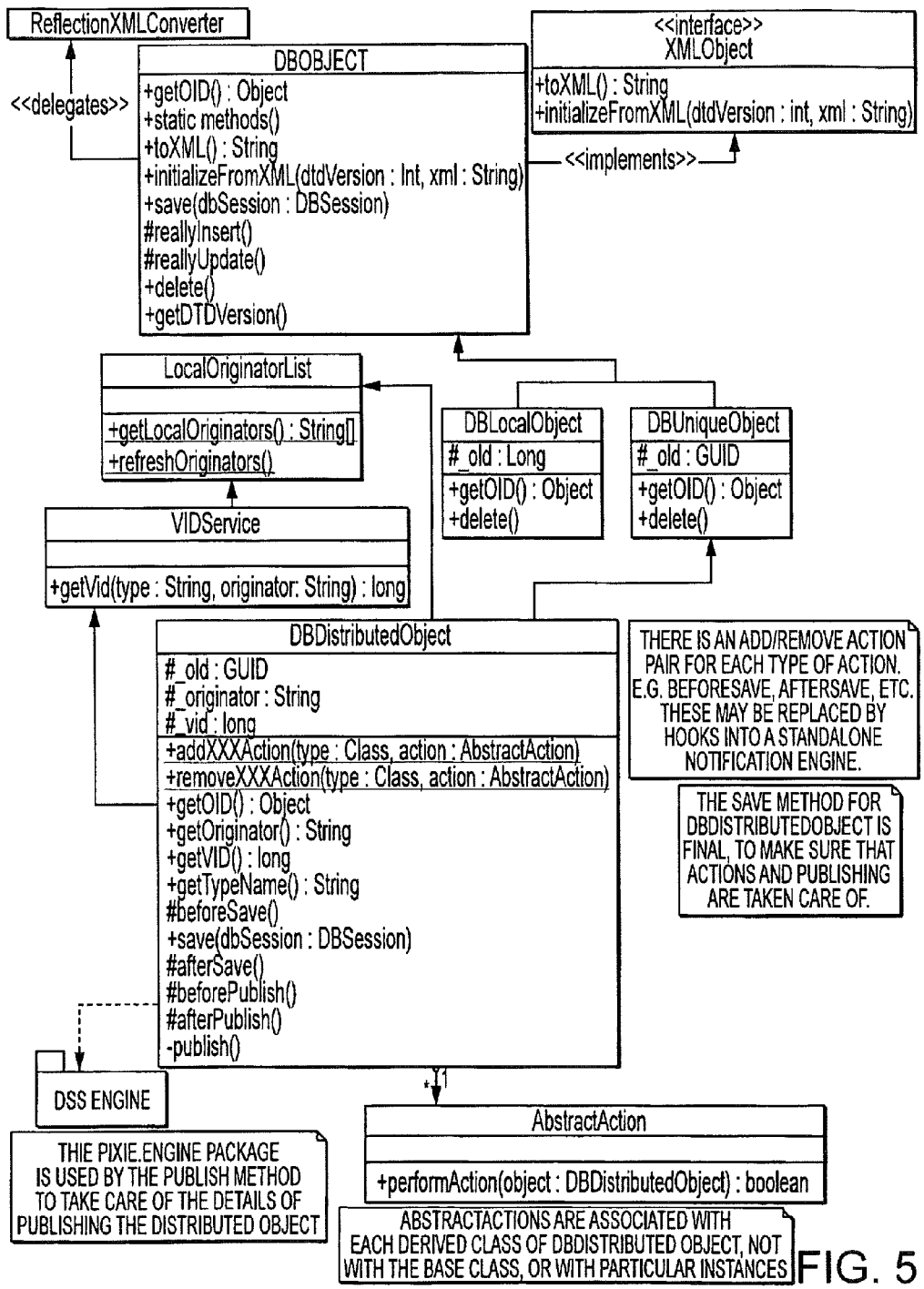
FIG. 5 is an illustrative class diagram that details a potential framework for Distributed Business Objects for the system of FIG. 1.

Distributed objects must be implemented in a way such that the changes required to legacy DBObject code are minimal. One illustrative example framework for is shown in the class diagram presented in FIG. 5.

An important aspect of the distributed community defined by the system is that it operates on a peer-to-peer basis, each storing and serving the collaboration services objects of the system. Infrastructure services provide mechanisms for ensuring these objects are distributed securely and efficiently within the community.

The system can include inbound and outbound bundle services that operate as managers for directing the internal traffic of WorldStreet Net objects and requests to the Infrastructure Services. Each infrastructure service provides a set of services that can be applied to nearly any system object, such as bundles, users, profiles, or directory. These infrastructure services are:

Object Replication and Synchronization services ensure that all of the servers operating within a specific group are kept up to date with the correct set of objects they require. For example, an aggregation server may own a set of users within the directory. As changes are made locally, they are replication to all other servers who should have access to this information.

Bundle Location and Retrieval services are responsible for optimally fetching bundles when needed. Location services determine where a bundle can be found, externally or within a local cache, and then provide the proper security steps to ensure only entitled services are given access to the bundle contents—which may be handled by on-demand conversations with the publisher or based an a time-to-live access period.

Route Optimization ensures the best network path is taken to access the resources required. Each aggregation server maintains dynamic network path tables containing network heuristics derived from hops, ping counts and physical connection types. Administrators can explicitly define preferred paths, allowing for traffic of specific types to only flow over private networks, for example.

Content Blending services interact with the Bundle Location and Retrieval services to create custom content collections based on bundle type, author, recipients, destination device or other criteria. Content blending can encompass things such as custom templates for varied presentations, specific content requests from external services or even the deletion or replacement of content within the original bundle. Content blending's goal is to build out context to ideas to deliver the recipient all information necessary to make instantaneous decisions.

Data Compatibility and Transformation services provide the ability for multiple versions of the system to interact with differing sets of DTD's present. Using XSL transformations, XML documents, which all Bundles and Meta-data are, can be translated into the dialect necessary for the version of services running on this Aggregation server. Additionally, these services can be used for extending the DTD's for use within a firm, so that a company may be able to include proprietary information for internal consumption, but drop it for external publication.

Telephony and Media services are a collection of third party software, such as Microsoft Media Server and Envox, and hardware, such as Dialogic telephony cards, that provide integrated voice messaging and streaming media services to bundle content. These are woven into bundles via specific tags embedded within the bundle XML.

Statistic Engine also provides billing services data to external accounting systems. The statistics engine tracks Bundle activity via the passing of the meta data through the Inbound and Outbound Bundle services detecting when users publish bundles, and when they request bundles. This information is then aggregated within a statistics database, and this data is shared with hosted services for billing purposes.

Figure 6:
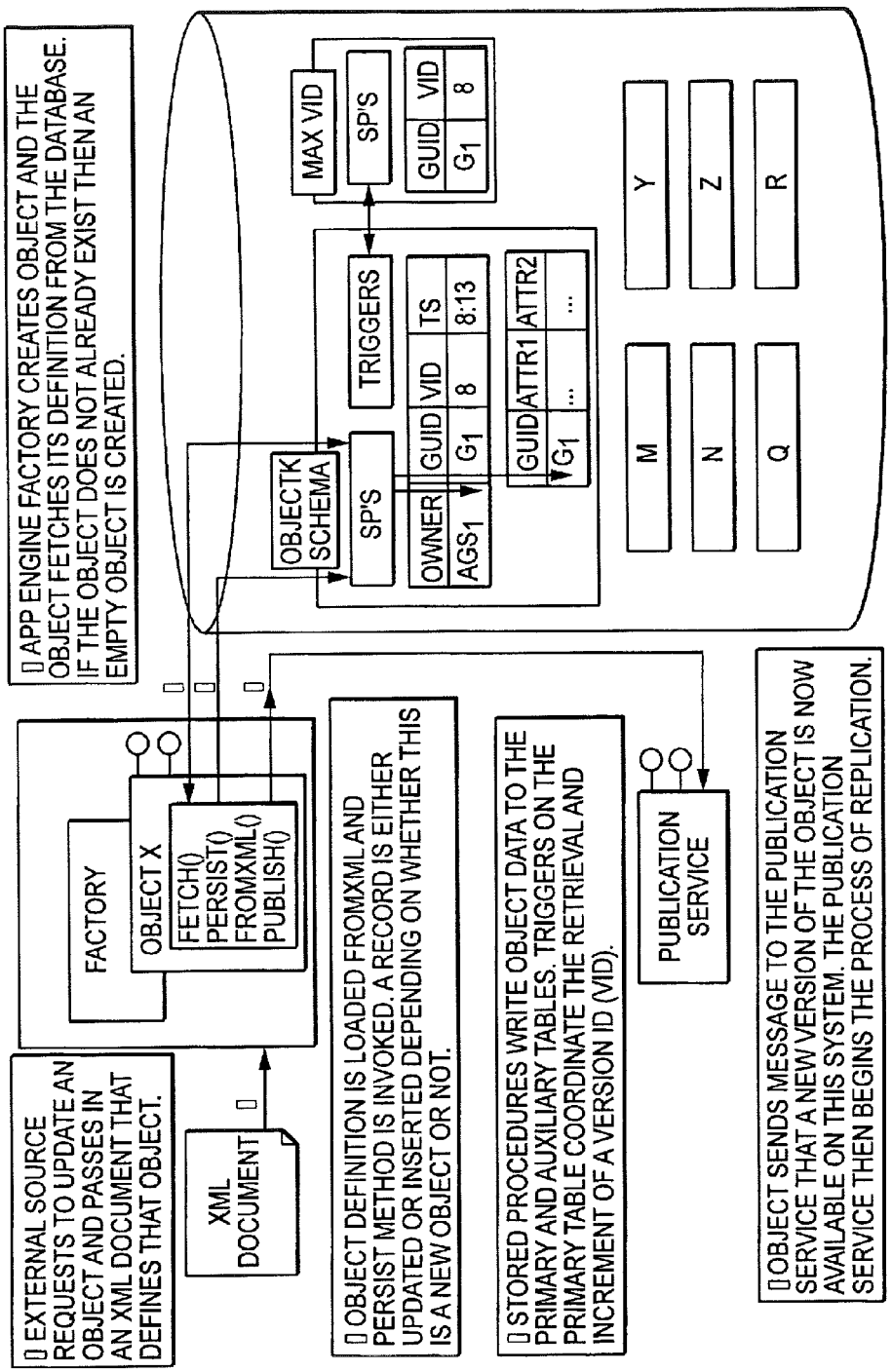
FIG. 6 is a block diagram that illustrates how an object is physically persisted to database in the system of FIG. 1.

FIG. 6 illustrates how an object is physically persisted to database. It is important to note the creation of a Globally Unique Identifier (GUID) and Version Identifier (VID) are performed within the database as a part of the overall transaction, ensuring no VIDs are wasted. Once the record is successfully written to the database, a message is sent out to the system community announcing the changes.

Figure 7:
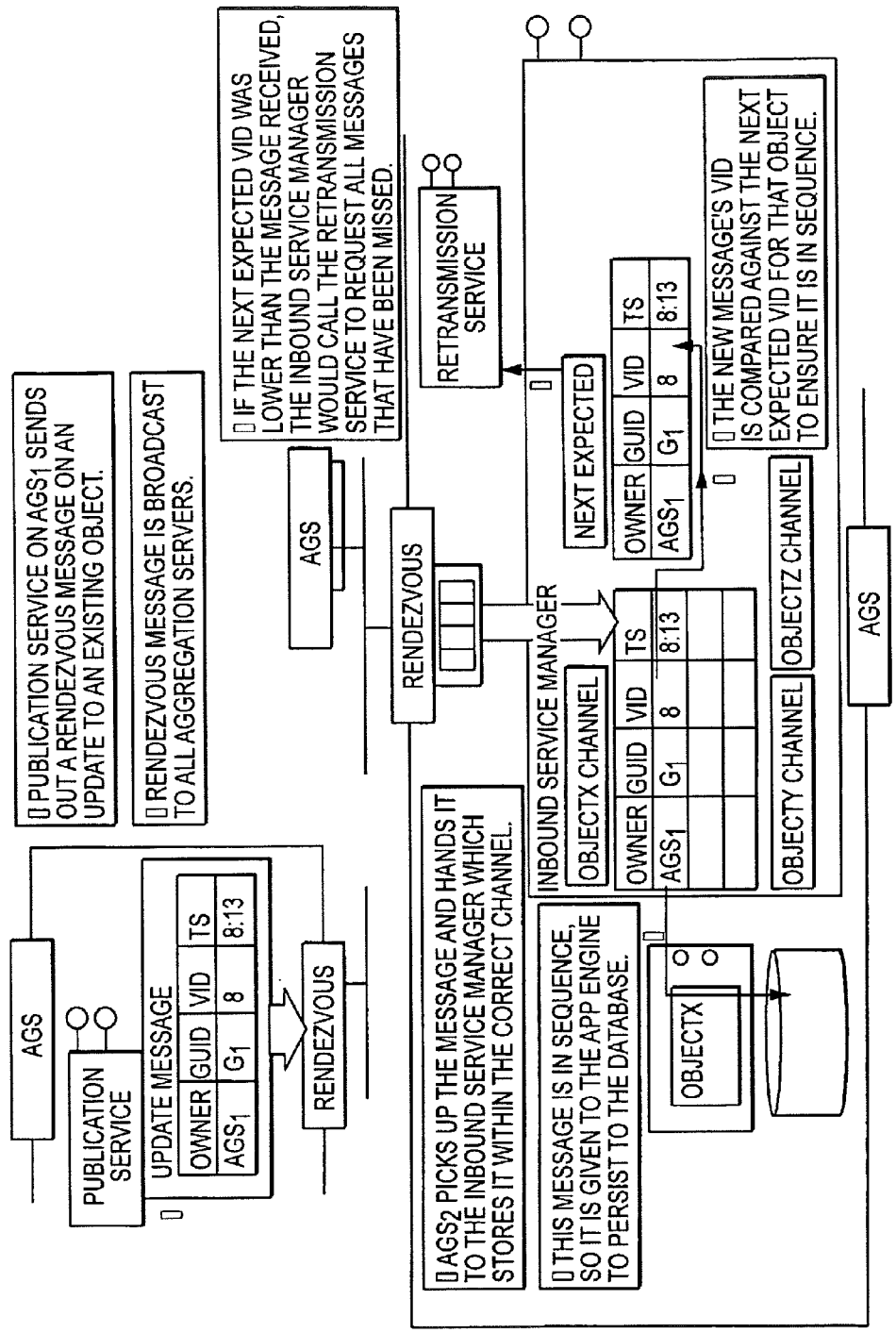
FIG. 7 is a block diagram illustrating the process by which changes are transmitted from one aggregation server to another in the system of FIG. 1.

FIG. 7 illustrates the process by which these changes are transmitted to another aggregation server. This is typical case example where everything occurs as expected and no information is out of sequence. Objects that publish changes to objects become the owner of that object, as such object ownership is a permission that can either be granted or revoked, preventing unauthorized edits to proprietary information.

Figure 8:
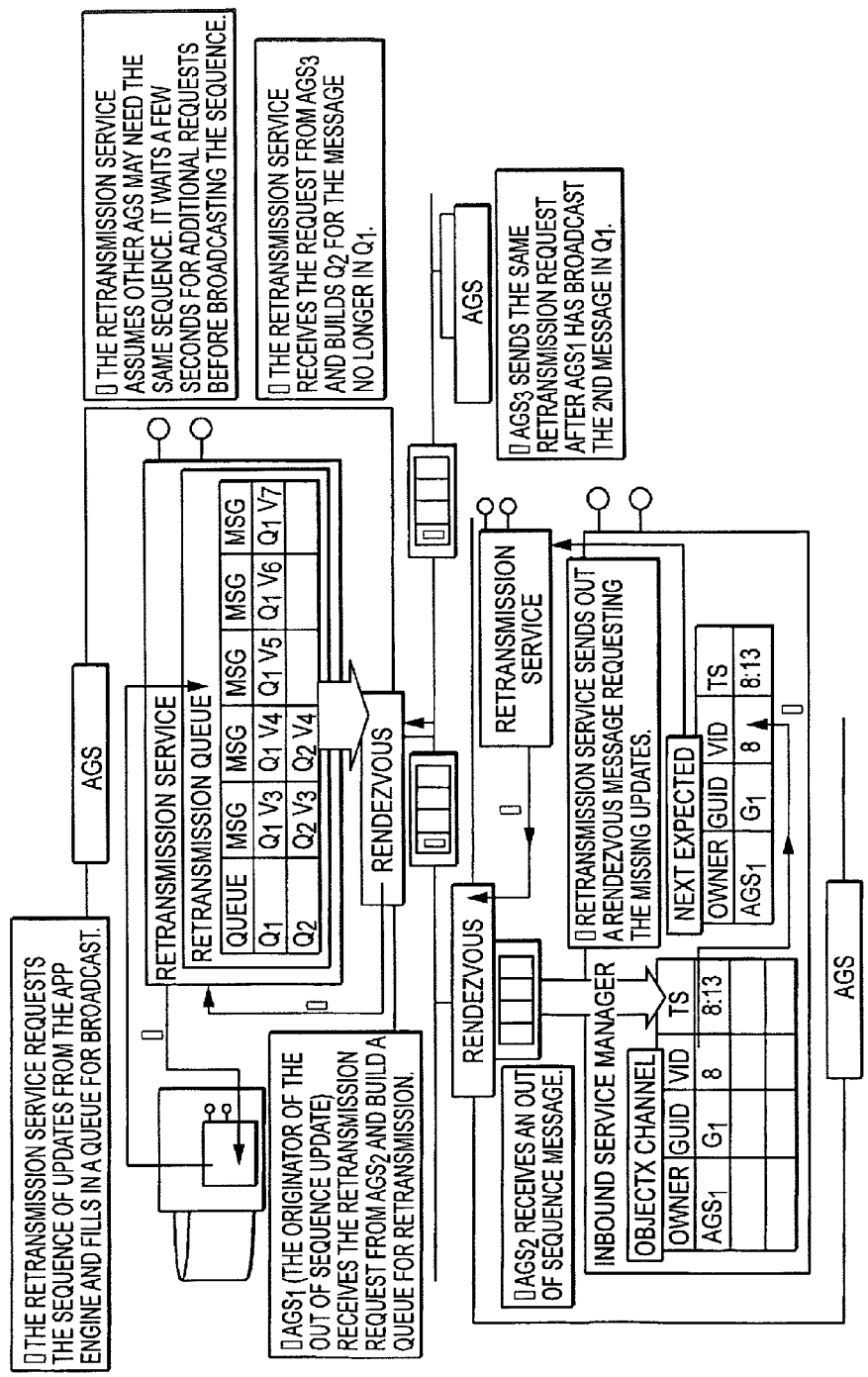
FIG. 8 is a block diagram that illustrates a scenario in which object change information is received out of sequence in the system of FIG. 1.

FIG. 8 illustrates a scenario where object change information is received out of sequence. This may be the result of a server going offline or being disconnected for a period from the rest of the community. When messages are received out of sequence, this causes the recipient's retransmission service to kick in and request all changes it may not have received. The publishing server has technology within its retransmission service to queue up the retransmission of messages temporarily so that it will not flood the network if many servers all request the same retransmission sequence.

Figure 9:
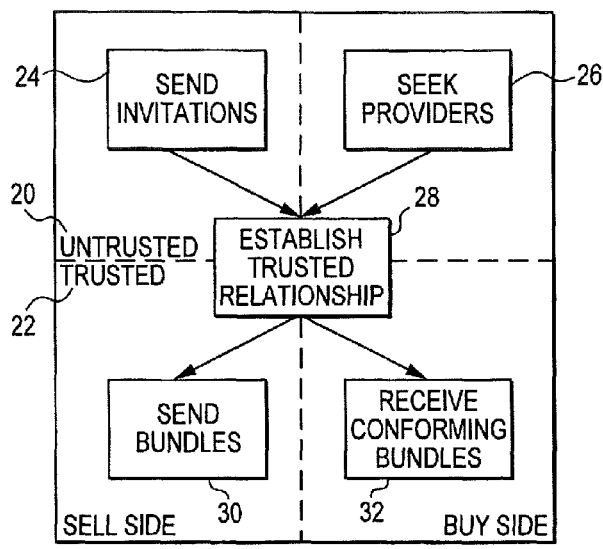
FIG. 9 is a high-level state diagram for the sales system of FIG. 1.

Referring to FIG. 9, system operation can include two overall phases, an untrusted phase 20 followed by a trusted phase 22. During the untrusted phase, buy-side users can send invitations (step 24) to sell-side users to encourage them to enter into a trusted relationship with them. At the same time, sell-side users can use network directory tools to seek sell-side providers on the network (step 26). The buy-side and sell-side users can then enter into the trusted relationship (step 28).

During the trusted phase 22, sell-side users prepare and send bundles to one or more buy-side users (step 30). If these bundles conform to settings in a user's profile, he or she will receive them (step 32). He or she can then review information associated with the bundles and respond to this information, either through the system or though another channel.

In the trusted phase, users gain access to the functionality of the infrastructure. Even within this phase, there can be levels of trust, so that only limited functionality is available to certain relationships. Trust can be limited at the option of either party. During the untrusted phase, users exchange information through invitations. For example, a salesperson might send an invitation to all of his buy side contacts at a particular firm. He can do this by setting up and sending a business card to all of the individuals he interacts with at the firm. The initiator of the relationship has the ability to link one or more already existing bundles to the invitation as a sample of the quality of his/her bundles.

Recipients can accept the invitations and can award the resulting relationships different relationship levels. These levels can affect the amount of information and the type of notification used for bundles received during the relationship. In a two-tier system, a recipient accepts a relationship with the sender of an invitation. The recipient does not want to receive irrelevant information from the sender, however, so she accepts the relationship but does not give him or her 'premier contact' privileges. The system can also have a directory look-up utility that allows all users to browse through information about all other users at every firm in the directory.

There can be different ways of rejecting a relationship. The first is known as the ultimate rejection. Issuing a rejection in this way prevents the initiator from ever sending an invitation to the recipient again, but the rejector may initiate a relationship when desired. A less permanent type of rejection prevents the initiator from sending invitations for a predetermined period. The recipient can also terminate the relationship at a later time, after he or she has had a chance to evaluate it.

Figure 10:
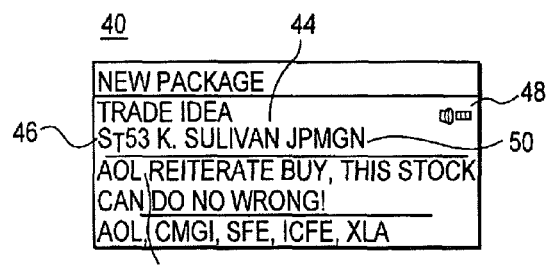
FIG. 10 is a screen view of a new bundle alert window for the system of FIG. 1.

Referring to FIG. 10, an illustrative user interface application that can be implemented using the extensible architecture framework provided by the system 10 will be discussed. While this user interface application is optimized for the financial services industry, many other systems can be developed for other types of groups, such as other industries, government entities, or non-profit organizations. For example, it is contemplated that such systems could be developed for supply chain management, where providers of raw materials and sub-assemblies can interact with manufacturers interested in their products. Although the organization, feature sets, and user interfaces of such other systems may differ from the one presented in a variety of ways that are consistent with their intended use, such systems will still benefit from the principles presented in this application.

In the embodiment presented, the user interface is provided by an application that runs on his or her terminal and interacts with XIA provided by the firm's application server. Because XIA presents a well-defined programming interface, different user interface applications can be readily designed for different types of systems, different firms, or different personnel functions. In addition, more than one application can interact with XIA at any particular time, allowing for different or more feature-rich interactions with the system. In the present embodiment, the user interface application is supplied and maintained by the administrative organization.

When a buy-side user (e.g., A1) receives a new bundle, the user interface application causes his or her terminal to show a new bundle alert window 40 for a short interval (e.g., 10 seconds), if the bundle passes the user's filters. The user interface application displays this window in response to a notification from XIA, which can include the following information: Bundle ID, Bundle type, Firm name, Firm ID, Date and time received, Tickers, Headline, whether there is a non-voicemail attachment, The voicemail ID for a voicemail (if there is one), and whether the bundle passes the user's filters.

The new bundle window presents a time area 42, a sender identification area 44, a headline area 46, a voice mail icon 48, and a ticker area 50. If the user clicks on the headline area, the system opens the bundle. If the user clicks on the voice mail icon in this embodiment, the system opens the bundle and plays the voice mail, but it is not possible to directly open attachments without opening the bundle. The new bundle window is not configurable, is always on, and is always triggered according to the same criteria. Note that an invitation is not considered a kind of a bundle, and that the new bundle alerter window is not brought up when an invitation is received.

Figure 11:
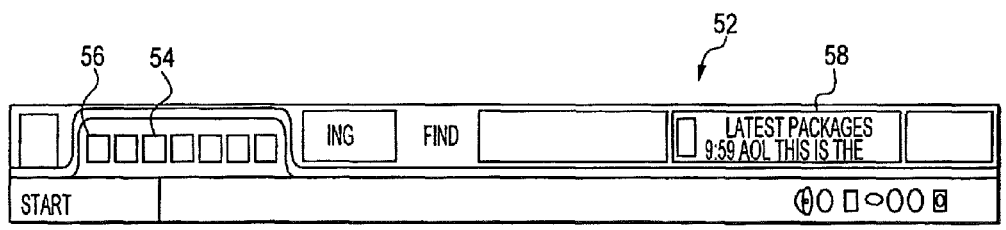
FIG. 11 is a screen view of a toolbar and system taskbar for the system of FIG. 1.

Referring to FIG. 11, the user can invoke different parts of the user interface application by right-clicking on an icon in the system tray 52, or by left-clicking on controls 54 in a tool bar 56. The different parts include windows for the following functions: Inbox, Outbox, Create bundle, Find bundle, Invitations (Received, Sent), Create invitation, Net, directory (Browse users, Find user), My profile, Create contact list, Statistics, and Admin.

The taskbar is kept on top of all other windows, and is dockable to the top or bottom of the screen. A latest bundle window 58 in the taskbar shows the time (or date if not today), tickers, and headline for the latest bundle received that passes the user's filters. If the user left-clicks this entry, then the corresponding bundle is opened. The user can also click on the icon to open a window that shows the latest ten bundles received that pass the user's filters. In this window, the user can also see a voicemail indicator icon and the author for each bundle. Clicking on the voicemail icon causes the user interface application to open the bundle and play the voicemail immediately. For the purposes of the latest bundles window, an invitation is not considered a kind of a bundle, and the latest bundles window is not updated when the user receives an invitation.

To implement these features, the user interface application needs to be notified when a new bundle is received, and whether it passes the user's filters. If there is a change, or on startup, the user interface application needs to be able to get details about the ten most recent bundles that passed the user's filters. These details can include Bundle ID, Headline, Ticker symbols, when the bundle was received, the voicemail ID of any voicemail associated with the bundle, the Author name, and the Author ID.

Referring to FIGS. 12 and 13, users can access an inbox window 60 through the toolbar or the system tray. This window includes a create control 62, a delete control 64, a find control 66, a grouping control 68, and a filters control 70. The options for the create control are create bundle and create invitation, which cause the system to present a create bundle window (see FIG. 16) and a create invitation window (see FIG. 19), respectively. The options for the grouping control allow the inbox to be grouped in a collapsible outline view according to a number of options, including: No Grouping, Group by Author, Group by Firm, Group by Sector, Group by Ticker (see FIG. 13), and Group by Type. The filters control allows the user to turn filtering on and off. The find ticker control can expand to a find selection box, where the options are Find Author, Find Firm, Find Sector, or Find Ticker. When a new bundle arrives, or a bundle is retracted, the inbox should be automatically refreshed if possible.

In this embodiment, the columns are click-sortable, but nothing happens when the user clicks on the header for the ticker column, the attachment icon column, the voicemail icon column, or the delete checkbox column. If the filters are on, the user interface application only shows bundles that match an interest list or bundles that were sent by premier authors, or bundles that were replies. For each bundle shown in the inbox, the user interface application displays the time received, the type, the corresponding ticker symbols, a non-voicemail attachment icon, a voicemail icon, a headline, an author name, and a firm name.

Left-clicking once on a bundle type causes the user interface application to display an inbox group by bundle type window. Left-clicking once on the ticker symbols causes the user interface application to display a popup menu that lets the user choose a specific ticker symbol, and when he or she chooses one, the user interface application presents an inbox find ticker result page for that ticker symbol. Left-clicking once on a voicemail icon causes the system to open the bundle and play the voice mail message immediately. Left-clicking on a headline opens the bundle details window (see FIG. 15). Left clicking once on an author name causes the system to present an inbox find author result window for that author, and left-clicking once on a firm name causes the system to present an inbox find firm result window for that firm.

Grouping by contact list, sector, or tickers requires that there be a special group for bundles that are not tagged with any sectors, and bundles that are not tagged with any tickers, respectively. Grouping by sectors results in only one level of grouping, even though there are both major sectors and minor sectors. Minor groups are separated within major groups with descriptive headings, such as "Computers (Hardware)."

Grouping by author causes the author column to disappear, grouping by firm causes the firm column to disappear, and grouping by bundle type causes the bundle type to disappear, but grouping by ticker does not cause the ticker column to disappear. For some views, a bundle can appear more than once. These are: group by ticker, group by interest, group by contact list, group by firm, and group by sector. Grouping is handled in this embodiment by the user interface application, instead of XIA.

By default, the find box is empty, there is no grouping, and the filters are on. If the find box is empty, and the user changes the "group by" selection, the filter does not change, and the view is immediately updated. Similarly, if the find box is empty, and the user changes the "filter by" selection, the group by does not change, and the view is immediately updated.

If the user requests a search by typing a search string into the find box, the "firm finder," "sector finder," "people finder," or "ticker finder" force the user to specify exactly one firm, sector, author, or ticker before the search string is sent to XIA. When the results come back from XIA, the group is set to by bundle type, and the filters are left on. The user can then change the grouping, and turn the filters off.

The number of bundles is displayed in the lower left corner of the inbox. But when grouping by ticker, for example, a bundle can appear more than once. The distinct number of bundles is displayed in such instances.

All searches can be sent to XIA for validation. If the search matches one target exactly, the value can still be returned from XIA, then sent back to XIA to retrieve the messages. If a search returns multiple values, a search results page displays them and forces the user to select a specific item or cancel the search. Table 2 lists a series of calls available to the user interface application for handling inbox functions.

TABLE 2 inboxWithoutFilters(userID) - ungrouped dump of all bundles without filters on.
inboxWithFilters(userID) - ungrouped dump of all bundles matching filters.
findAllBundlesForAuthor(userID, targetUser) - ungrouped dump of all bundles that match the author name.
findAllBundlesForFirm(userID, firm) - ungrouped dump of all bundles that match the firm name.
findAllBundlesForSector(userID, sector) - ungrouped dump of all bundles that match the sector.

TABLE 2-continued findAllBundlesForTicker(userID, ticker) - ungrouped dump of all bundles that match the ticker symbol.
findFilteredBundlesForAuthor(userID, targetUser) - ungrouped dump of filtered bundles that match the author name.
findFilteredBundlesForFirm(userID, firm) - ungrouped dump of filtered bundles that match the firm name.
findFilteredBundlesForSector(userID, sector) - ungrouped dump of filtered bundles that match the sector.
findFilteredBundlesForTicker(userID, ticker) - ungrouped dump of filtered bundles that match the ticker symbol.

Note that in the embodiment presented, some industry-specific functionality is included within XIA, instead of in its preferred location in the user interface application.

Referring to FIG. 14, the outbox window 76 is in many ways similar to the inbox window, except that bundles cannot be deleted from the outbox, but can instead be retracted. In the inbox, the system shows the (single) author, but in the outbox, it shows the (many) recipients. The inbox shows received dates while the outbox shows sent dates. There is no filtering for outbox messages, and outboxes can only be grouped by firm, sector, ticker, and type. The system shows a status indication for bundles in the outbox, and in the firm view, the outbox groups by the recipient's firm instead of by the firm of the author of the bundle. There is no find bundle textbox on the outbox. A modal warning dialog is displayed when the user tries to retract a bundle.

When the user sends or retracts a bundle, the outbox window can be updated if it is open, but the application should be able to do this without notification from XIA, since the user will presumably request retraction from the user interface application. The following information is received from XIA for each bundle: Bundle ID, Bundle type, Headline, Date Sent, Recipient List (names and ID's), List of ID's for recipients' firms, List of short names for recipients' firms, Ticker List, Sectors, List of voice mail ID's, List of non-voice mail attachment ID's, and Status. A function called outbox(userID) can request the return of an ungrouped dump of all bundles sent. A function called retractBundle(userID, bundleIDList) can request retraction of a collection of bundles.

Figure 15:
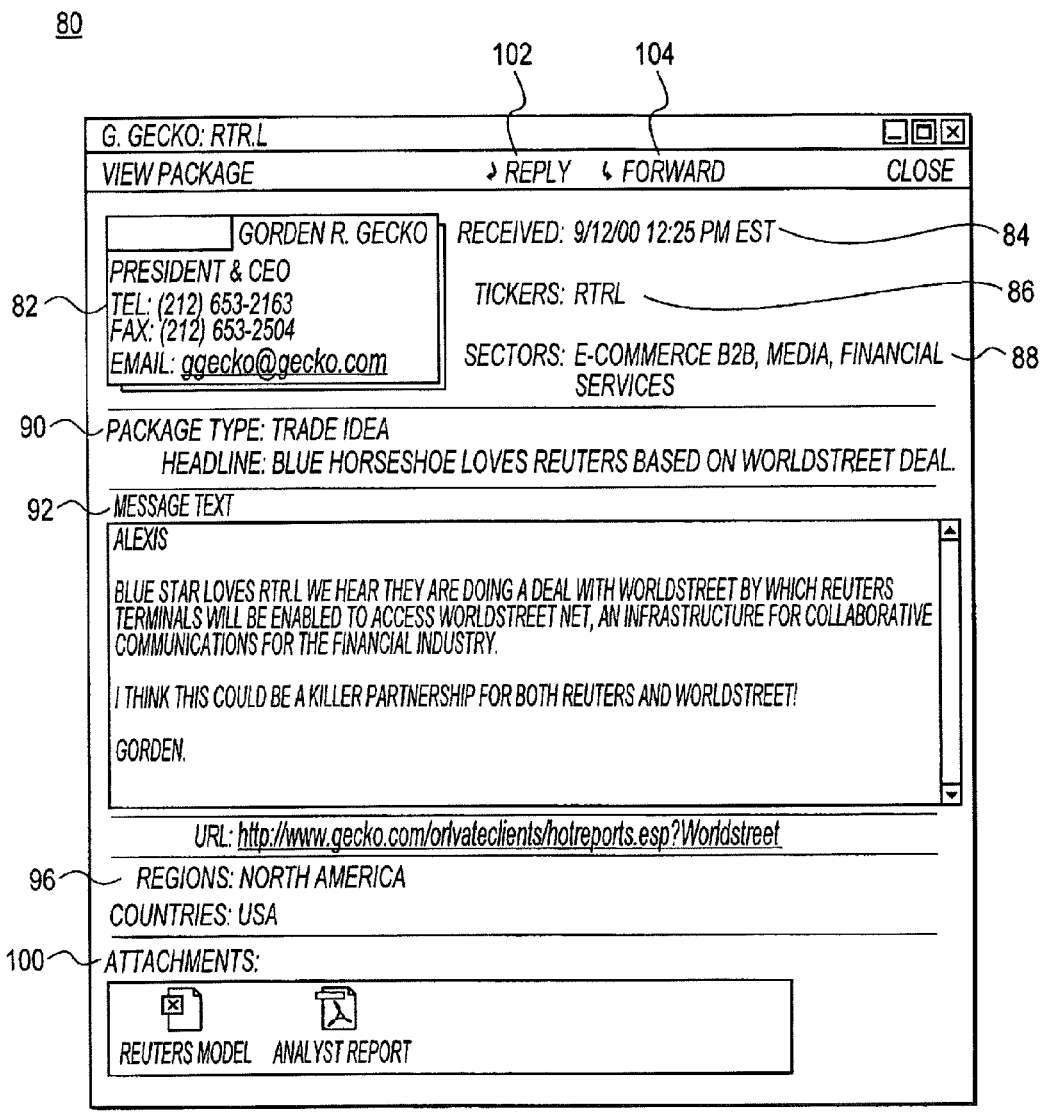
FIG. 15 is a screen view of a bundle details window for the system of FIG. 1.

Referring to FIG. 15, the bundle detail window 80 includes a branded business card area 82, a date received area 84, a ticker symbol area 86, and a sector area 88. Also included are a bundle type identifier 90, a text area 92, a network location area 94, a regions area 96, and a countries area 98. An attachments area 100 is provided for voicemail and non-voicemail attachments, and reply and forward buttons 102, 104 are provided as well.

If the bundle for which the bundle details window is being displayed is being forwarded, the user has to explicitly open the bundle being forwarded from the details window if he or she wants to see it. This is so that retrieval of the forwarded bundle will be a separate billable event. For a forwarded bundle, the user interface application will display an icon in the attachments area that the user can click on to open the bundle being forwarded. If the bundle for which the details window is being displayed is a reply to a bundle the user sent, the user can get to the original bundle as well, but he or she has to explicitly open it from the attachments section.

In this embodiment, the bundle details window displays a created date, but not an expiration date or a sent date. If the bundle is unforwardable, then the "forward" button can be grayed out. Clicking on the business card area causes the user interface application to display the business card details window for the author (see FIG. 22). Clicking on an attachment or voicemail will cause the user interface application to launch it with an appropriate associated program. In this embodiment, there is no delete button in this window, and the names of other recipients of the bundle are not displayed.

Note that even if the user is the author of this bundle, he or she will not be able to display the recipients of this bundle in this embodiment. The user will also only be able to forward the bundle if the bundle itself is forwardable. The user will be able to reply to his or her own bundle, and there can be a retract button.

Figure 16:
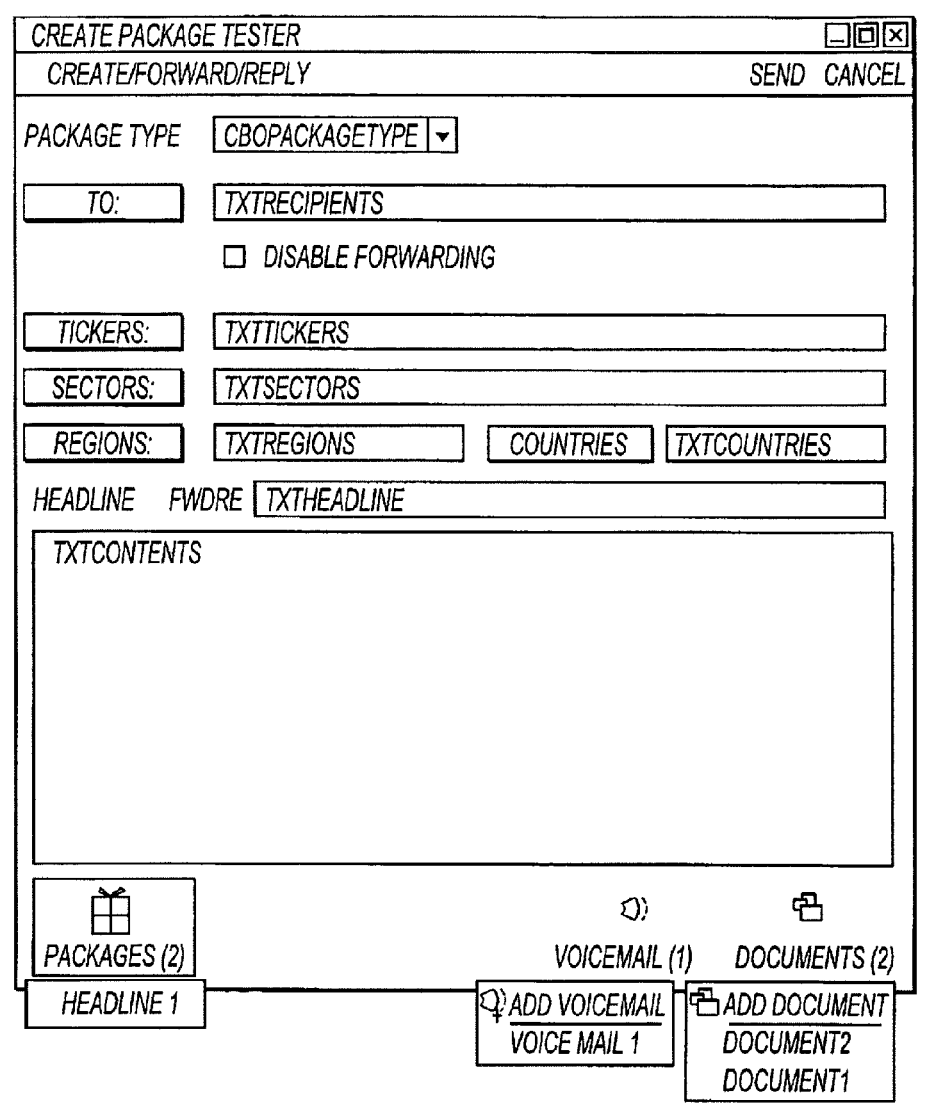

Referring to FIG. 16, the create bundle window includes an attachment section at the bottom that will have one icon on the left that represents either a bundle that is being forwarded or a bundle that is being replied to, as well as one icon for each attachment (both voicemail and document). The user can delete a voicemail attachment or a document attachment by selecting it and pressing "delete."

The user can click on the heading for the countries, regions, and sectors text boxes to bring up an appropriate picker window. He or she can also "lookup" tickers. The user also has a choice to use either the people picker or the people finder to address the recipient list. The people picker and people finder can be set up to only enable the user to select people he has a relationship with, however. Buttons allow users to add attachments and voicemail, and a textbox allows the user to type in a URL.

When replying to a bundle, regions, countries, sectors, and tickers are inherited from the original message, and they can't be edited. The user can't edit the recipient list—only the originator can get the reply. The headline can't be edited—it has to be "Re:" plus the original headline. Only the body and add attachments can be edited. (The reply message does not inherit the original message's attachments—the recipient of the reply will be able to get at them by opening the original message.)

When forwarding a bundle, the user can edit anything, except an icon representing the bundle being forwarded, and the "FWD:" prefix on the headline. However, the regions, countries, sectors, tickers, and headline will be initialized to the values from the bundle being forwarded. If the bundle is a reply to a mail, then the original mail appears as an icon in the attachment section. Similarly, if the bundle is being forwarded, the original document being forwarded, appears as an icon at the bottom left corner. In either case, this icon can not be deleted.

Referring to FIG. 17, an invitations received window lists invitations received. It can include a "create" menu that expands to "create invitation" and "create bundle," and a "view received" menu that expands to "view received" and "view sent." Accept and decline buttons allow the user to accept and decline invitations. An "accept premier" button may also be provided to create premier relationships.

Referring to FIG. 18, an invitations sent window is also provided. It includes controls allowing the user to create invitations, revoke them, and view replies. This window can automatically update itself as the user creates and revokes invitations.

Referring to FIG. 19, a create invitation window can allow the user to address an invitation to many people, but the system will create one separate invitation for each recipient. The user can use the people picker or the people finder to add people to the invitation. The people picker and finder can be set to force the user to choose people that the user does not have a relationship with.

Referring to FIGS. 21 and 22, selecting a directory entry on the toolbar allows the user to choose either a "find" or a "browse" control. Choosing "browse," will cause the system to bring up the address book (FIG. 20). Choosing find will cause the system to bring up the people finder (FIG. 21). This window allows the user to type in part of a name, choose somebody from the search results, and go to the user details page for that person.

There are four views on the address book window. These include directory filtered views for the following sets of users: system-wide, my relationships, my contact lists, and non-relationships. In the left side of the window the system displays a tree. The highest level of this tree will be the list of all firms. The firms will be alphabetized, except the user's firm will be on top. The firms will be expandable, into groups with the firm, and then the groups can be expanded to show groups within each group. Users do not appear in this tree. A user can, however, select a firm or a group from this tree. Upon selecting a group, all of the users in that group appear on the right side. Selecting a firm will cause all of the users that are in that firm that have not been assigned to any group at all to appear on the right side.

The "my relationships" view can be the same as the system directory view, except the system only shows people that have a relationship with the user, it only shows groups that contain people that have a relationship with the user or that have subgroups that have to be shown, and it only shows firms that have a person that has a relationship with the user. The "non-relationships" view can be the same as the system directory view, except that the system only shows people that do have a relationship with the user, it only shows groups that contain people that do not have a relationship with the user or that have subgroups that it has to show, and it only shows firms that have a person that does not have a relationship with the user. The "my contact lists" view has a flat list of the names of the user's contact lists on the left side. If the user highlights a contact list, then the people on that contact list appear on the right side.

All views can be color coded by people, group, and the firm. A person will be color-coded green if the user has a relationship with that person, and red if the user does not. A group will be color-coded green if it contains any green subgroups or green users, and red otherwise. A firm will be color-coded green if the user has a relationship with any member of that firm, and red otherwise. A contact list will be color-coded green if the user has a relationship with any member of that contact list.

The user can highlight multiple people on the right side. If nobody is highlighted, or if anybody that is highlighted has a relationship with the user, then the "invite" button can be grayed out. If nobody is highlighted, or multiple people are highlighted, then the "details" button can be grayed out. The people picker employs a similar interface to the address book.

Referring to FIG. 22, a business card window can be provided for each user. This window provides an identification of the firm with which the user is associated (e.g., a logo), and information about the individual. Controls may also be provided to establish filters to accept or deny bundles from the user, and relationship initiation and termination controls may also be provided. For example, if a user has a relationship with the user identified in a business card details view, an "end relationship" button could be displayed. If no relationship existed, an "invite" button could be displayed, and this button could lead the user to the "create invitation" window, with the recipient box prepopulated.

Figure 23:
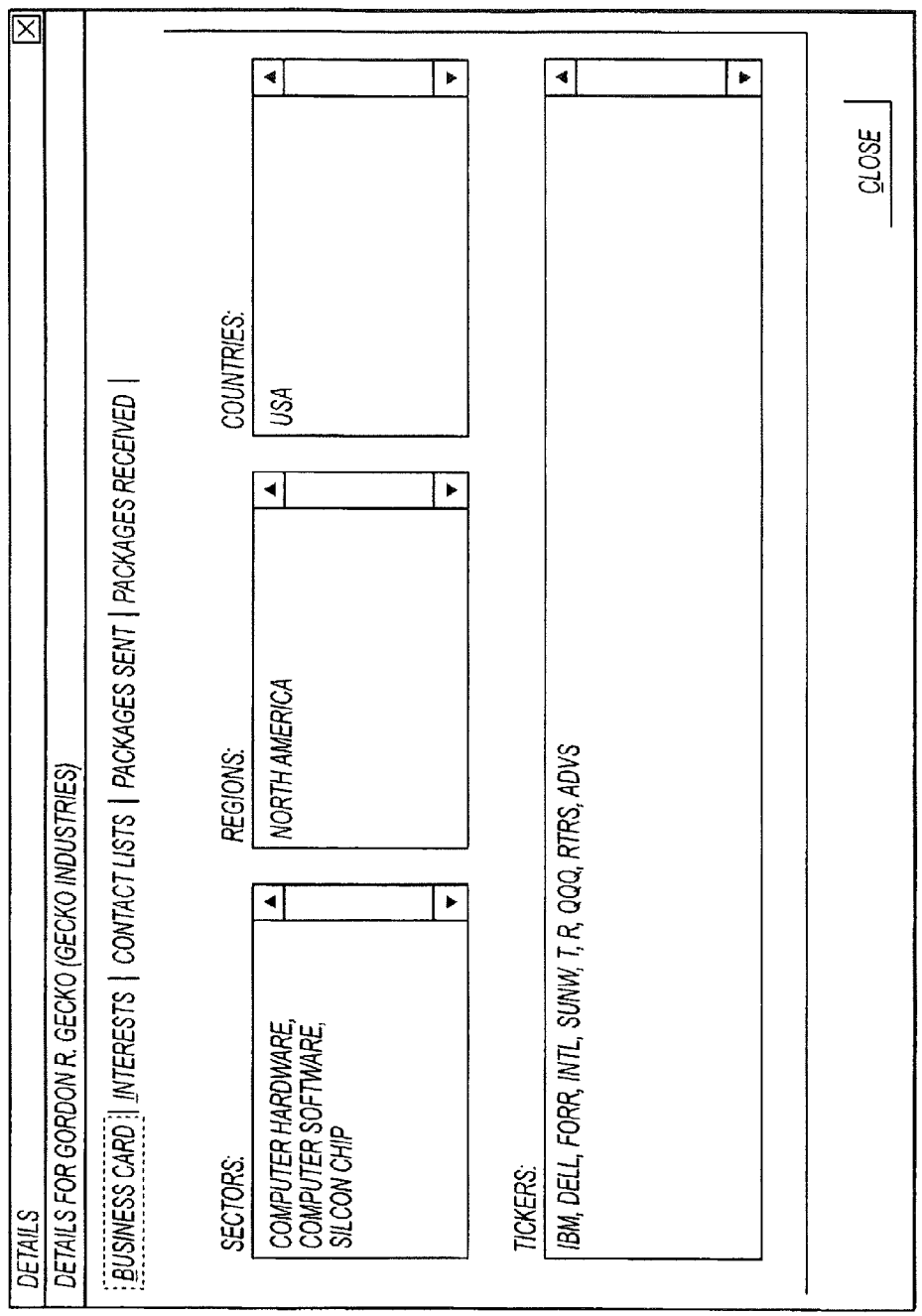
FIG. 23 is a screen view of an interests details window for the system of FIG. 1.

Referring to FIG. 23, an interests window is reachable from the business card view. This window includes a series of interest category values that can be used for searches and filtering. Some or all of this information may not be available to users that do not have a sufficiently close relationship with the user, based on user preference commands and/or system settings. This window therefore allows a user to divulge a safe amount of information about him or her interests to a targeted group of users.

Referring to FIG. 24, a most active screen presents most active entities for different metrics. In this embodiment, these include top tickers, top sectors, top authors, and top firms. The statistics displayed in this type of window are based on statistics gathered by the aggregation servers on the numbers of transactions that take place in the system. Similar views can be presented for publication and coverage gap statistics. Publication statistics provide information about amounts of use of the system, and coverage gap statistics provide information comparing service levels between firms.

A full-featured user interface application can also include a number of additional windows, allowing users and administrators to input information, select values, set preferences, and otherwise control and interact with the system. As for the windows presented above for purposes of illustration, the exact configuration of these windows can be changed without substantial impact on features available to the invention. In the embodiment presented here, additional windows can relate to the following topics: Interests, Contact Lists, Bundles, My Profile, Business Card Editor and Change Password, Interest Lists Manager, Summary, General, Tickers, Sectors, Regions, Countries, Contact Lists Manager, Statistics, Most Active, Publication, Coverage Gap, Admin (Administer User), Firm Directory, Add/Edit User (General), Add/Edit User (Permissions), Add/Edit User (Groups), Add/Edit User (Interests), Admin (Administer Firm), Group Directory, Bundle Expiration, Admin (Administer Bundles), Administer Bundles, Reference Data Finders and Pickers, Ticker Picker, Sector Picker, Region Picker, Country Picker, User Role Selector, and Bundle Type Selector.

Since profiles are provided to XIA from the user interface applications, these can be updated automatically before being provided to the aggregation servers. Using this capability, a portfolio management system could be tied directly into the profiling systems of the aggregation server, for example. Such a system would allow profiles to be automatically updated and as positions are established and liquidated, ensuring that information flow is always relevant, and eliminating time-consuming profile maintenance. As trades are conducted on a mutual fund, for example, the profile for the fund is automatically updated. So when the fund sells all of its stock in the ACME corporation, the profile no longer includes an entry for ACME.

While the system's user interface is based on software-based graphical user interface elements, it could also be implemented in other ways, such as using physically actuated controls or auditory prompts. The function and structure of the user interface elements can also be broken down in different ways than those shown in figures, with elements being combined, separated, or recast as appropriate. And while the system's user interface elements are presented as displayed in windows, one of ordinary skill in the art would recognize that they could also be displayed in other types of display regions, such as screens, cards, or pages.

Certain data—notably, the meta data describing bundles that can be downloaded through applications that interact with the system—is distributed, i.e. it is persisted on a variety of servers. In situations where data is duplicated in multiple locations, there is potential for problems:

If data can be edited in more than one place or by more than one person, there is potential for editing conflicts when two people edit the same data simultaneously.

When data is edited, there may be a time lag between when the edits are distributed to the various duplicate sites.

Thus, consumers of the data at different servers may be working from inconsistent data.

When a server goes down or is otherwise unable to receive edits, it must be able to recognize that it holds erroneous data and must be able to recover correct data in a timely fashion, without allowing corrupted data to propagate.

The system addresses these issues through its Distributed Database Service. Distributed data is managed through this software layer.

Every shared data object has an "originating server" or "home" that is its owner. Ownership can be transferred among servers, but there is never more than one owner. Only the owner can edit the object. His or her server has a "locking" mechanism assuring that only one application or user can edit the object at a time. As a result, there can never be conflicts from simultaneous edits.

Every data object has a unique 128-bit identifier. This identifier includes not only the identity of the data object, but also the version of the data object. In addition, every server maintains, for different types of data object, a version identifier. This identifier is unique to the server and to the version of all data that falls within its data type. Whenever a data object is edited, added, or deleted, the server's data object version identifier increments.

These server data object version identifiers are broadcast on the network on regular heartbeats, typically every five seconds. Other servers on the network maintain a record of the version updates they have successfully received from every server for every data object type, and can tell from the version identifiers if they have missed any changes to shared data objects. If they have, they communicate to the home server the version identifier of the last successful update. They then receive all missing updates from the home server.

Updates are typically communicated only as edits (indicating what has changed), not as complete retransmissions of the whole object, in order to conserve network bandwidth. As a result, updates are always implemented in the correct order, to assure that the object is correctly preserved.

For instance, suppose that the out-of-date server had last received state 37 for data type four from originating server 206.35.232.146, and learned from a heartbeat that state 44 was current for that data type from that server. It would request changes 38, 39, 40, 41, 42, 43, and 44 and execute them in sequence, in order to regain data synchronization.

Data can be restricted in its distribution to local groups of aggregation servers, or to any intermediate association of aggregation servers. For instance, for scalability, performance, minimization of global network traffic, or other reasons, a single firm may wish to have multiple aggregation servers. In such cases, the Distributed Database Service would be used to synchronize proprietary data within the firm's aggregation servers. An example of proprietary data that might be synchronized across a subset of the Exchange aggregation servers includes Profiles and Watch Lists, so that a user could access the Exchange through any of a firm's aggregation servers.

Systems according to the invention can employ standard meta data tags, or Business Language Definitions (BLDs). Each BLD is a particular keyword which can have certain values, including multiple values. The values that can be attached to the keywords may be standardized through community agreement. For instance, BLDs defined to serve the securities industry include Sector, Ticker, Region, and Country. Reuters Instrument Codes (RICs), for example, may be used as security identifiers (tickers, in the case of stocks), so that a typical meta data tag might be "Ticker=AOL, AON, MSFT, TNTC".

Once a BLD is defined, so that the keyword has been reserved for a particular purpose throughout the network, then the a statistics engine begins to gather statistics on the use of this keyword and the values associated with it, as well as the behavior of users in response to bundles containing this keyword and particular values. Of course, users are free to add proprietary tags to their bundles. The statistics engine may gather data on the usage of these non-standard keywords, but the ability to analyze the use of the keywords will be limited.

Key BLD's for all industries include Author, Firm, and Bundle Type. Statistics based on these keywords allow clients to track the activity and success of different publishing individuals and firms. Key BLD's for the securities industry are Ticker, Sector, Region, and Country.

Usage data is gathered continuously, whenever applications create, modify, or download bundles. The statistics engine gathers usage data in near-real-time, and creates statistical "slices" or summaries of activity. This activity is then distributed to community members according to an appropriate algorithm. For example, some members may have purchased subscriptions to all statistics, others to limited statistics, others to time-delayed or summary statistics.

Statistics are of two broad types, real-time and historical. Real-time statistics provide a snapshot of activity now (that is, over the last hour, or the last day, or the last ten minutes). They may be updated periodically, say every ten minutes. Examples of statistical slices include the most often published values for each BLD (keyword), and the most often downloaded values for each BLD. E.g., if the BLD was Ticker, MSFT might be the most published, and IBM the most downloaded.

Historical statistics present how the statistics have varied over time. They can be presented in terms of percentage changes day over day, or in the form of charts presenting trends over time. Examples of statistical slices include: top movers (biggest percentage increase in activity, biggest percentage decrease) for each BLD, ratio of BLD-value activity to overall incidence of all values for that BLD over the last year.

These statistics can be applied to help firms judge the value of their commercial partners, and to evaluate potential partners. For instance, in the securities industry, a portfolio manager considering becoming the client of a Wall Street analyst group could examine their historical statistics for information such as: how often were their publications downloaded by their clients? Did they lead or lag their competitors in publishing reports on "hot" tickers? Once the analysts are actually serving a portfolio manager, he or she might judge the value they are providing by looking at how often employees within his or her firm consume research reports published by those analysts. Within a firm, statistics can be used to evaluate employees. For instance, a Wall Street firm might evaluate salespeople by frequency of publication, or might link statistics on employee production to revenue and identify the most effective salespeople. The same firm might evaluate analysts by the frequency with which their publications are downloaded.

Firms may also use statistics to evaluate the market as a whole. These may reveal what all portfolio managers are looking at, for example. This information can help firms redirect resources to the most profitable opportunities, and to learn of an emerging opportunity in near-real-time. A Wall Street firm might also look for stocks that have received an increase in portfolio manager interest, but which its analysts haven't published any research on. Time lags also represent useful information. The system may reveal how long it takes, on average, between publication and readership, for a firm and its competitors.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

The invention claimed is:

1. A networked computer system for managing commercial interactions, comprising:
   a network;
   a plurality of data sources; and
   a plurality of aggregation servers operatively coupled to the network and the data sources, each aggregation server including a processor and memory storing instructions that, in response to receiving a request for access to a service, cause the processor to:
   receive a data bundle comprising a bundle header and a plurality of bundle contents, wherein the bundle header includes routing data and meta data, the routing data specifying a destination address for the bundle that instructs the aggregation server to electronically transmit and deliver the bundle, and the meta data including at least one meta data tag comprising a keyword having at least one value;
   perform content blending asynchronously through a processing platform, said processing platform comprising at least one connection point for direct interactions with infrastructure services and applications, said content blending comprising at least one of adding content to the bundle, deleting one or more of the bundle contents, and replacing one or more of the bundle contents, responsive to a trigger condition configured independently on each aggregation server, and comprising one or more predetermined conditions;
   broadcast periodically bundle version identifying signals to a plurality of nodes of the network indicating changes to the bundle content; and
   distribute the bundle, said distributing comprising at least one of publishing the bundle and providing the bundle in response to a request, said publishing comprising pushing and transmitting the bundle so that recipients receive the bundle contents for caching before the bundle is requested.

2. The system of claim 1 wherein the processor is caused to add the content at least one of an aggregation server of a sender of the bundle, a core infrastructure of the system, or an aggregation server of a recipient of the bundle.

3. The system of claim 1 wherein at least one user application is configured to allow the content to be added at a computer desktop of a sender or a recipient of the bundle.

4. The system of claim 1 wherein the content blending comprises the processor being caused to add the content from any compatible data source as a layer to the bundle.

5. The system of claim 1 wherein the content blending comprises the processor being caused to add the content by building a super bundle around the existing bundle.

6. The system of claim 1 wherein the content blending comprises the processor being caused to add the content by transforming the existing bundle.

7. The system of claim 1 wherein the content blending comprises the processor being caused to add the content automatically as it passes through the aggregation server.

8. The system of claim 1 wherein the predetermined conditions comprise a user request for the content.

9. The system of claim 1 wherein the predetermined conditions comprise a presence of at least one predetermined meta data tag on the bundle, and wherein the processor is caused to add the content to the bundle responsive to the presence of the predetermined tag.

10. The system of claim 1 wherein the keyword is at least one of Author, Firm, and Bundle Type.

11. The system of claim 1 wherein the keyword is at least one of Ticker, Sector, Region and Country.

12. The system of claim 1 wherein the processor is further caused to:
   gather statistics on use of the keyword and the at least one value associated with the keyword; and
   gather statistics on behavior of users in response to bundles containing the keyword and the at least one value associated with the keyword.

13. The system of claim 12 wherein the processor is caused to gather at least one of the statistics on the use of the keyword and the statistics on the behavior of the users continuously, in near-real-time.

14. The system of claim 12 wherein the processor is further caused to:
   distribute at least one of the statistics on the use of the keyword and the statistics on the behavior of the users according to an algorithm.

15. The system of claim 1 wherein the network is a private network comprising a value-added network (VAN) or a virtual private network (VPN).

16. The system of claim 1 wherein an interface is defined for at least one data source, and a third party implementing the defined interface functions as a source of content.

17. The system of claim 1 wherein the system comprises a plurality of aggregation groups distributed worldwide, each aggregation group comprising a plurality of aggregation servers, wherein each aggregation group and each server within each aggregation group functions both independently and collectively as part of the networked computer system.

18. The system of claim 1 wherein the content blending is user-specific, responsive to entitlements stored on the aggregation server.

19. The system of claim 1 wherein the aggregation server is further caused to:
   generate a storage descriptor comprising a unique identifier that corresponds to a particular content segment; and
   retrieve the content identified by the storage descriptor.

20. The system of claim 1 wherein the aggregation server is configured to cache content received from another aggregation server.

21. The system of claim 20 wherein the cached content is configured to require a release certificate, and wherein the cached content is distributed only when the release certificate is received from an owner of the data source that the content originated from.

22. A networked computer system for managing commercial interactions, comprising:
   a network;
   a plurality of data sources; and
   a plurality of aggregation servers operatively coupled to the network and the data sources, each aggregation server including a processor and memory storing instructions that, in response to receiving a request for access to a service, cause the processor to:

receive a data bundle comprising a bundle header and a plurality of bundle contents, wherein the bundle header includes routing data and meta data, the routing data specifying a destination address for the bundle that instructs the aggregation server to electronically transmit and deliver the bundle, and the meta data including at least one meta data tag comprising a keyword having at least one value;

perform content blending through a processing platform, said processing platform comprising at least one connection point for direct interactions with infrastructure services and applications, said content blending comprising at least one of adding an additional content to the bundle, deleting one or more of the bundle contents, and replacing one or more of the bundle contents, responsive to a trigger condition configured independently on each aggregation server, and comprising one or more predetermined conditions; wherein each additional content remains resident on a node associated with a data owner in the network, issue periodically bundle version identifying signals to the different nodes of the network indicating changes to the bundle content;

distribute the meta data and routing data from the bundles through the network, distribute copies of the additional bundle content in the bundles from the network node of their respective data owners to the network nodes of accessors, following selection of the additional content by the accessors using the meta data and the routing data distributed through the network; and distribute the bundle, said distributing comprising at least one of publishing the bundle and providing the bundle in response to a request, said publishing comprising pushing and transmitting the bundle so that recipients receive the bundle contents for caching before the bundle is requested.

* * * * *